(12) United States Patent
Zhang et al.

(10) Patent No.: US 10,152,202 B2
(45) Date of Patent: *Dec. 11, 2018

(54) MOBILE DEVICE AND METHOD FOR RESPONDING TO EVENTS OF USER INTERFACE OF MOBILE DEVICE

(71) Applicant: Shanghai Holaverse Network Technology Co. Ltd., Shanghai (CN)

(72) Inventors: Yang Zhang, Beijing (CN); Kai Yu, Beijing (CN); Jiankai Zhao, Beijing (CN)

(73) Assignee: Shanghai Holaverse Network Technology Co. Ltd., Shanghai (CN)

( * ) Notice: Subject to any disclaimer, the term of this patent is extended or adjusted under 35 U.S.C. 154(b) by 559 days.

This patent is subject to a terminal disclaimer.

(21) Appl. No.: 14/765,308

(22) PCT Filed: May 6, 2014

(86) PCT No.: PCT/CN2014/076905
§ 371 (c)(1),
(2) Date: Jul. 31, 2015

(87) PCT Pub. No.: WO2014/183578
PCT Pub. Date: Nov. 20, 2014

(65) Prior Publication Data
US 2015/0370427 A1 Dec. 24, 2015

(30) Foreign Application Priority Data
May 16, 2013 (CN) .......................... 2013 1 0182308

(51) Int. Cl.
*G06F 3/0488* (2013.01)
*G06F 3/0482* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC combination set(s) only.
See application file for complete search history.

(56) References Cited

U.S. PATENT DOCUMENTS 5,900,877 A * 5/1999 Weiss .................. G06F 3/04847
715/803
2006/0242607 A1 * 10/2006 Hudson ............... G06F 3/04817
715/863

(Continued)

FOREIGN PATENT DOCUMENTS

CN 101840299 A 9/2010
CN 102541445 A 7/2012
(Continued)

OTHER PUBLICATIONS

International Patent Application No. PCT/CN2014/076905; Int'l Search Report; dated Aug. 8, 2014; 2 pages.

*Primary Examiner* — Doon Chow
*Assistant Examiner* — Wendy Nicholas
(74) *Attorney, Agent, or Firm* — Baker & Hostetler LLP

(57) ABSTRACT

The disclosed are a mobile device and a method for responding to events of a user interface of a mobile device. The method comprises: detecting a first trigger action on the user interface; calculating a coordinate of the position where the first trigger action occurs; according to the coordinate, determining that a response region to which the position belongs is the ith to the nth layer of response region, wherein i∈[1, n]; judging whether the position belongs to the valid region of the ith layer of response region, and if yes, responding to the first trigger action in the ith layer of response area; otherwise, updating i to i+1, repeating this
(Continued)

step until i is equal to n+1. By means of the above-mentioned solution, a mobile device is enabled to accurately respond to an operation of a user on the sector user interface.

25 Claims, 8 Drawing Sheets

(51) Int. Cl.
    *G06F 3/0481*     (2013.01)
    *G06F 3/0484*     (2013.01)
    *H04M 1/725*     (2006.01)

(52) U.S. Cl.
    CPC ...... *G06F 3/04883* (2013.01); *G06F 3/04886* (2013.01); *H04M 1/72583* (2013.01)

(56) References Cited

U.S. PATENT DOCUMENTS

| | | | |
|---|---|---|---|
| 2009/0160792 A1 | 6/2009 | Morohoshi et al. | |
| 2010/0083190 A1* | 4/2010 | Roberts | G06F 3/04883 715/863 |
| 2010/0124946 A1* | 5/2010 | Chun | G06F 3/0416 455/566 |
| 2010/0241985 A1 | 9/2010 | Kim et al. | |
| 2010/0333030 A1* | 12/2010 | Johns | G06F 3/048 715/834 |
| 2011/0138324 A1* | 6/2011 | Sweeney | G06F 3/0481 715/800 |
| 2012/0036434 A1* | 2/2012 | Oberstein | G06F 3/0482 715/702 |
| 2012/0124615 A1* | 5/2012 | Lee | H04N 21/25875 725/30 |
| 2013/0174092 A1* | 7/2013 | Li | G06F 3/04847 715/823 |
| 2013/0268897 A1* | 10/2013 | Li | G06F 3/0482 715/841 |
| 2014/0075388 A1* | 3/2014 | Kuscher | G06F 3/0482 715/834 |

FOREIGN PATENT DOCUMENTS

| | | |
|---|---|---|
| CN | 102609187 A | 7/2012 |
| CN | 102830917 A | 12/2012 |
| CN | 103092508 A | 5/2013 |
| CN | 103226446 A | 7/2013 |
| CN | 103279266 A | 9/2013 |

* cited by examiner

MOBILE DEVICE AND METHOD FOR RESPONDING TO EVENTS OF USER INTERFACE OF MOBILE DEVICE

CROSS-REFERENCE TO RELATED APPLICATIONS

This application is a National Phase Application of Application No. PCT/CN2014/076905, filed May 6, 2014, which claims priority to Chinese Patent Application No. 201310182308.8, filed May 16, 2013, the disclosures of which are incorporated by reference in their entireties.

TECHNICAL FIELD

The present invention is related to the technical field of smart terminal, and in particular, to a mobile device, a method for responding to events of a user interface of a mobile device, a computer program and a computer readable medium.

BACKGROUND ART

With the rapid development of the smart terminal technology, various applications provided for a smart terminal are more and more abundant. It follows then that increased number of application icons is necessarily present in user interface (hereafter referred to as UI) of the smart terminal. Taking a smart phone using Android system as an example, this system may provide a user with a number of installed applications. In UI of the system, application icons corresponding to the applications are displayed in a form of page-by-page. When the user is searching for an application icon, he/she has to browse page by page. The operations of this kind of search manner would be complicated and lack of efficiency.

SUMMARY OF THE INVENTION

In view of the above problems, the present invention is proposed to provide a mobile device and a corresponding method for responding to events of a user interface of a mobile device, to overcome the above problems or at least partially solve or relieve the above problems.

According to one aspect of the present invention, there is provided a method for responding to events of a user interface of a mobile device, wherein the user interface contains n layers of a response region, wherein the response region is a transparent rectangle, and the n layers of response region overlap at one of their corners or edges, wherein the mth layer of response region is larger than the m−1th layer of response region, m∈[2, n]; a valid region of the 1st layer of response region is a sector region, and valid regions of the 2nd to the nth layers of response region are annulus sector regions, the method comprises: detecting a first trigger action on the user interface; calculating coordinates of the position where the first trigger action occurs; determining the response region to which the position where the first trigger action occurs belongs is the ith to the nth layers of response region according to the coordinates of the position where the first trigger action occurs, wherein i∈[1, n]; and judging whether the position where the first trigger action occurs belongs to the valid region of the ith layer of response region, and if yes, responding to the first trigger action in the ith layer of response region; otherwise, updating i to i+1, and repeating this judging step until i being equal to n+1.

According to another aspect of the present invention, there is provided a mobile device, a user interface being presented on a screen of the mobile device, the user interface contains n layers of response region, wherein the response region is a transparent rectangle, and the n layers of response region overlap at one of their corners or edges, wherein the mth layer of response region is larger than the m−1th layer of response region, m∈[2, n]; a valid region of the 1st layer of response region is a sector region, and valid regions of the 2nd to the nth layers of response region are annulus sector regions, the mobile device comprising: a first action detecting device, configured to detect a first trigger action on the user interface; a first calculating device, configured to calculate coordinates of the position where the first trigger action occurs; a first region detecting device, configured to determine the response region to which the position where the first trigger action occurs belongs is the ith to the nth layers of response region according to the coordinates of the position where the first trigger action occurs, wherein i∈[1, n]; and a first responding device, configured to judge whether the position where the first trigger action occurs belongs to the valid region of the ith layer of response region, and if yes, respond to the first trigger action in the ith layer of response region; otherwise, update i to i+1 and repeat this process until i is equal to n+1.

According to still another aspect of the present invention, there is provided a non-volatile computer readable medium, having instructions stored thereon that, when executed by at least one processor, cause the at least one processor to perform operations for responding to events of a user interface of a mobile device, wherein the user interface contains n layers of response region, the response region is a transparent rectangle, and the n layers of response region overlap at one of their corners or edges, wherein the mth layer of response region is larger than the m−1th layer of response region, m∈[2, n]; a valid region of the 1st layer of response region is a sector region, and valid regions of the 2nd to the nth layers of response region are annulus sector regions, the operations comprising: detecting a first trigger action on the user interface; calculating coordinates of the position where the first trigger action occurs; determining the response region to which the position where the first trigger action occurs belongs is the ith to the nth layers of response region according to coordinates of the position where the first trigger action occurs, wherein i∈[1, n]; and judging whether the position where the first trigger action occurs belongs to the valid region of the ith layer of response region, and if yes, responding to the first trigger action in the ith layer of response region; otherwise, updating i to i+1, and repeating this judging step until i being equal to n+1.

Advantages of the present invention are as follows:

The present invention may implement responding to a user's trigger action in an order of priority of various response regions of the sector user interface for responding to an event. After a first trigger action on the user interface is detected, coordinates of the position where the first trigger action occurs may be calculated, and the layer of response region where the first trigger action occurs may be determined on the basis of the coordinates. Since response region is formed into a rectangular shape, and the n layers of response region overlap at one of their corners or edges and increase sequentially, if the position where the first trigger action occurs is in the ith layer of response region, it is necessarily in the i+1th to the nth layers of response region. On the ground of this, the solution of the present invention may first judge whether the position where the first trigger action occurs is in the valid region of the ith layer of response region; if no, it may in turn judge whether the position where the first trigger action occurs is in the valid region of the i+1th layer of response region. That is, the order of the priority of the ith to the nth layers of response regions for responding to the event is from high to low. By the above solution, the mobile device is able to exactly respond to the user's operations on the sector user interface.

The above description is merely an overview of the technical solution of the present invention. In order to more clearly understand the technical solution of the present invention to implement in accordance with the contents of the specification and to make the foregoing and other objects, features and advantages of the present invention more apparent, detailed embodiments of the present invention will be provided below.

BRIEF DESCRIPTION OF THE DRAWINGS

Various other advantages and benefits will become apparent to those of ordinary skilled in the art by reading the following detailed description of the preferred embodiments. The drawings are merely included for the purpose of illustrating the preferred embodiments and should not be considered to be limiting to the present invention. Further, throughout the drawings, like reference signs indicate like components. In the drawings.

DETAILED DESCRIPTION OF THE EMBODIMENTS

Hereinafter, the present invention will be further described in connection with the drawings and the particular embodiments.

Figure 5:
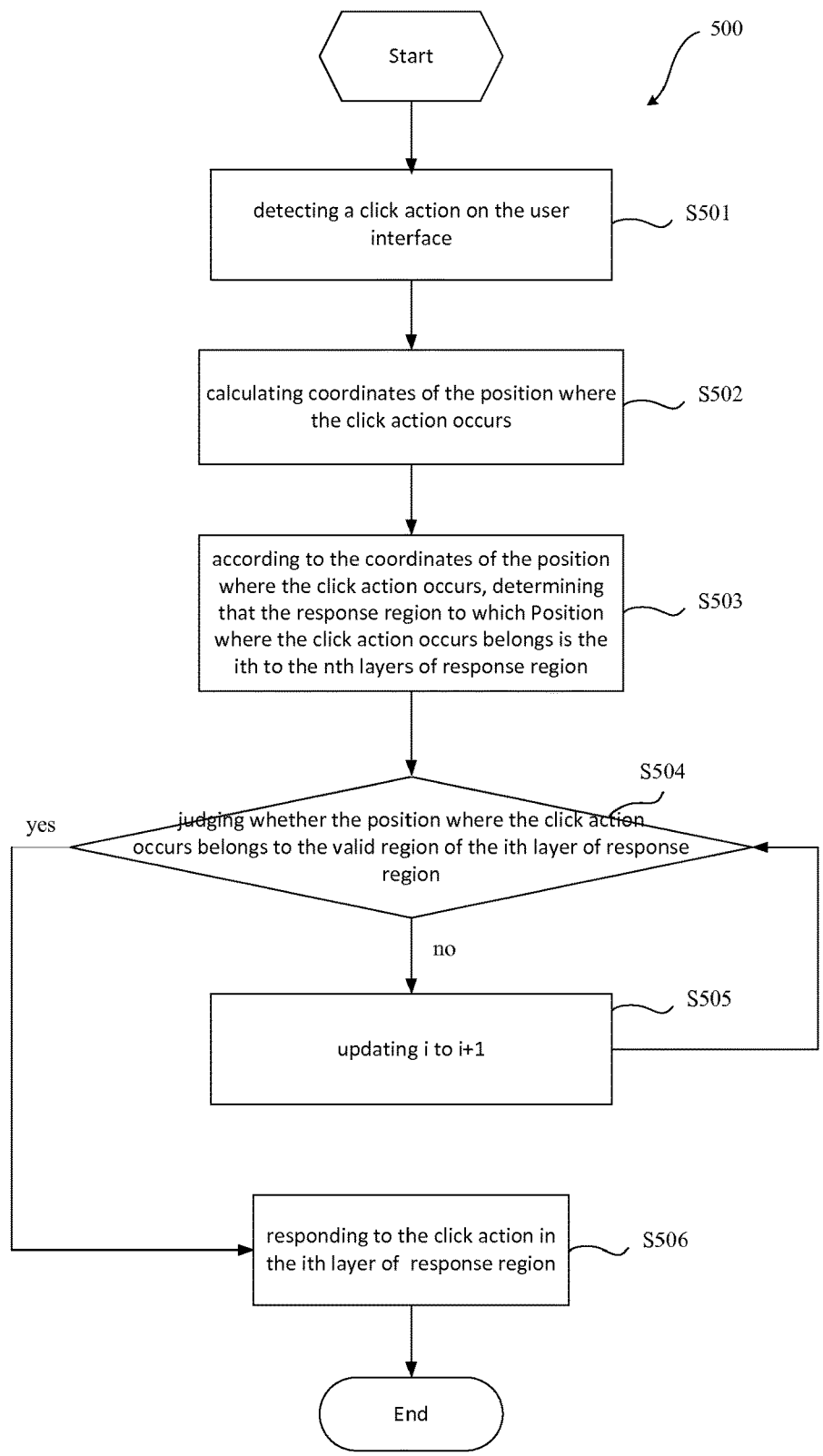
FIG. 5 is a flow chart schematically showing a method for responding to events of a user interface of a mobile device according to one embodiment of the present invention.

As for the above problems in prior art, the present invention is to provide a mobile device and a method for responding to events of a user interface of a mobile device. This scheme is for detecting a trigger action by a user of a sector user interface pre-displayed on a screen, and making a corresponding event response to the trigger action. As shown in FIG. 5, the sector user interface pre-displayed on the screen may include n layers of response region, wherein the response region is a transparent rectangle, and the n layers of response region overlap at one of their corners or edges with each other, wherein the mth layer of response region is larger than the m−1th layer of response region, m∈[2, n]; a valid region of the 1st layer of response region is a sector region, and valid regions of the 2nd to the nth layers of response region are annulus sector regions. The above method for responding to events may include steps of: detecting a first trigger action of the user interface; calculating coordinates of the position where the first trigger action occurs; determining the response region to which the position where the first trigger action occurs belongs is the ith to the nth layers of response region, according to the coordinates of the position where the first trigger action occurs, wherein i∈[1, n]; judging whether the position where the first trigger action occurs belongs to the valid region of the ith layer of response region, and if yes, responding to the first trigger action in the ith layer of response region; otherwise, updating i to i+1, and repeating these steps until i being equal to n+1.

In order to better understand the technical solution provided by the present invention, an implementation method of the sector user interface will be first explained below.

The presentation of the sector user interface may be activated through detecting the trigger action by the user on the mobile device. Herein, the trigger action may include a click or a double-click action on a designated button; or a sliding action from the lower right corner toward the upper left of a screen; or a sliding action from the lower left corner toward the upper right of a screen; or a sliding action from the upper right corner toward the lower left of a screen; or a sliding action from the upper left corner toward the lower right of a screen; or a sliding action from one side toward the opposite side of a screen; or the like. Whereas, the above mentioned trigger actions should not be considered as limiting the scope of the present invention.

Figure 1:
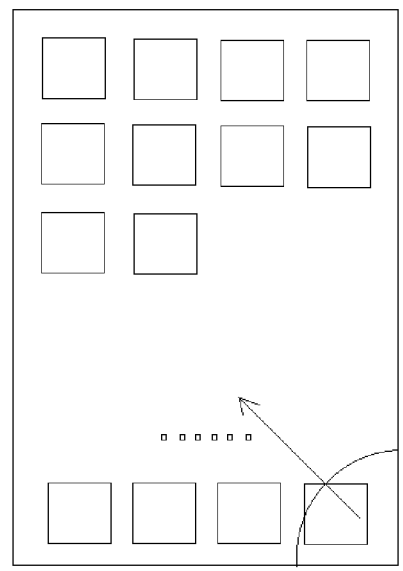
FIG. 1 is a schematic diagram showing a trigger action on a mobile device by a user for presenting sector user interface according to one embodiment of the present invention.

FIG. 1 is a schematic diagram showing a trigger action on a mobile device by a user of for presenting sector user interface according to one embodiment of the present invention. As shown in FIG. 1, based on the screen provided by the mobile device, the user may activate the user interface by the sliding action from the lower right corner toward the upper left of the screen, and then the user interface will be displayed in the lower right corner of the screen. This method may define a valid range for the sliding action. If a coordinate system is established by taking the lower right corner of the screen as an origin, according to one embodiment of the present invention, the valid range may be defined as an angular range [110°, 210°]. The angular range may be determined based on a vector related with gesture, and the starting point of the vector is not necessarily positioned at the origin of the coordinate system. To activate the user interface, the vector angle of the sliding action is required to be positioned within the valid range. Also, the particular judgement of the vector angle could be made by a tangent value which is able to indicate angle. For example, the valid range is set to a tangent value range, such as [tg 110°, tg 210°]. After a sliding action on the mobile device is detected, it may proceed to calculate the tangent value of the vector angle of the sliding action based on the starting point and the ending point coordinates of the sliding action, and to decide whether the tangent value falls in the above tangent value range; if so, the user interface will be activated. According to the present invention, a sliding action from the lower left corner toward the upper right of the screen may be also used to activate the user interface, and then the user interface will be displayed in the lower left corner of the screen. Of course, the present invention may also define a valid range for the sliding action from the lower left corner toward the upper right of the screen. FIG. 1 is merely an example of the present invention and should not be considered as a limiting thereof.

In response to the trigger action, n layers of response region may be displayed and non-transparent image may be displayed in the valid region of each layer of response region. Taking the Android system as an example, the basic unit of the user interface (hereinafter referred to as UI) element in the Android system is a view which responds to the trigger action as a whole. The view per se may be formed into a rectangular shape. In order to apply the present invention to the Android system or other similar system, the response region of the present invention may also have a rectangular shape. However, in order to provide a sector user interface for the user, according to the present invention, the response region may be divided into the valid region and the invalid region, wherein the response region is transparent, the valid region displays non-transparent image, and the non-transparent valid regions of various layers of response region are combined into the sector user interface.

Figure 2:
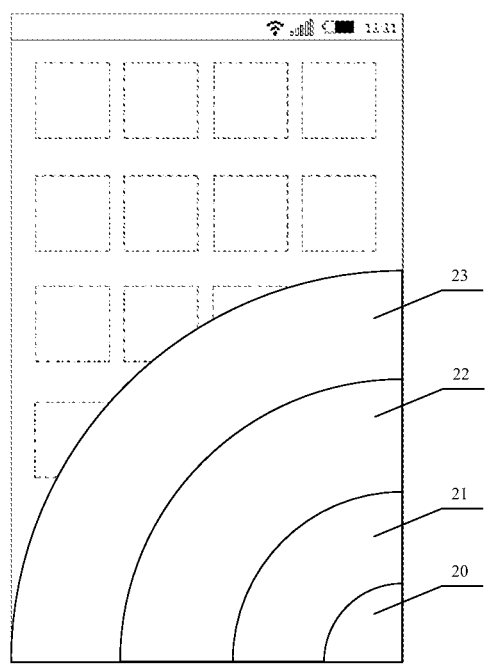
FIG. 2 is a schematic diagram showing a user interface according to one embodiment of the present invention.

Description will be given by taking a user interface having 4 layers of response region as an example, but the present invention is not limited thereto. FIG. 2 is a schematic diagram showing a user interface according to one embodiment of the present invention. The user interface as shown in FIG. 2 has 4 layers of response region, which have transparent rectangle shapes and overlap at one of their corners or edges with each other. In particular, if the sector user interface is required to be displayed in a corner area corresponding to a certain corner of the screen, the 4 layers of response region, with one of their corners, will overlap at that corner of the screen; if the sector user interface is required to be displayed in a side edge area corresponding to a certain edge of the screen, the of 4 layers of response region, with one of their side edges, will overlap at that edge of the screen. Herein, the mth layer of response region is larger than the m−1th layer of response region, wherein m∈[2, n]. That is, from the $1^{st}$ layer of response region, areas of various layers of response region increase sequentially. Since the response region has the transparent rectangle shape, the response region with the rectangular shape can not be seen in FIG. 2, which means the user is unperceptive to the response region.

At the time of displaying each layer of response region, the valid region of each layer of response region may show the non-transparent image. Since the valid region of each layer of response region shows the non-transparent image, the valid region of each layer of response region could be seen in FIG. 2. As shown in FIG. 2, the valid region 20 of the $1^{st}$ layer of response region is sector region, and the valid region 21 of the $2^{nd}$ layer of response region, the valid region 22 of the $3^{rd}$ layer of response region and the valid region 23 of the $4^{th}$ layer of response region are annulus sector regions. The valid regions of these 4 layers of response regions do not overlap with each other. In order to indicate more apparently a relationship between the valid region and other region (i.e., invalid region) except for the valid region in one layer of response region, description will be given by taking the $2^{nd}$ layer of response region in FIG. 2 as an example.

Figure 3:
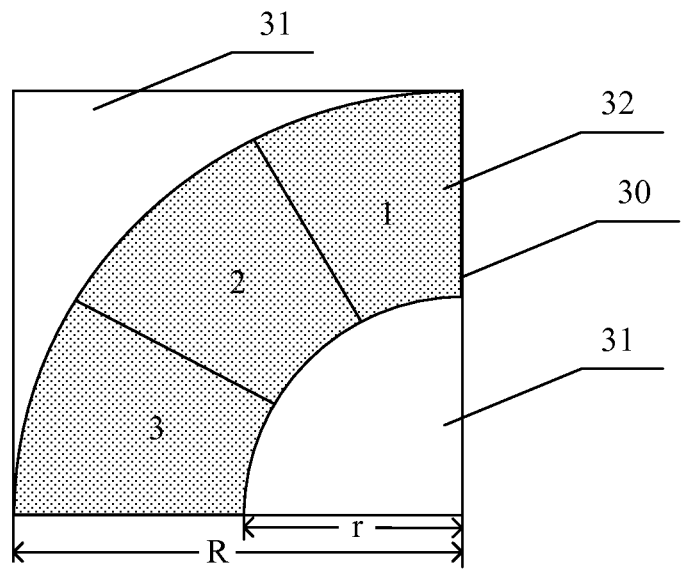
FIG. 3 is a schematic diagram showing a $2^{nd}$ layer of response region in FIG. 2.

FIG. 3 is a schematic diagram showing the $2^{nd}$ layer of response region in FIG. 2. As shown in FIG. 3, the $2^{nd}$ layer of response region is a rectangular region 30, the valid region 32 of the $2^{nd}$ layer of response region is an annulus sector region, and other region except for the annulus sector region is the invalid region 31. Herein, the valid region refers to a region that may respond to the trigger action of the user, and the invalid region refers to a region that may not respond to the trigger action of the user. Only when position of the trigger action is in the valid region 32 of the $2^{nd}$ layer of response region, the $2^{nd}$ layer of response region could respond to the trigger action.

Figure 4:
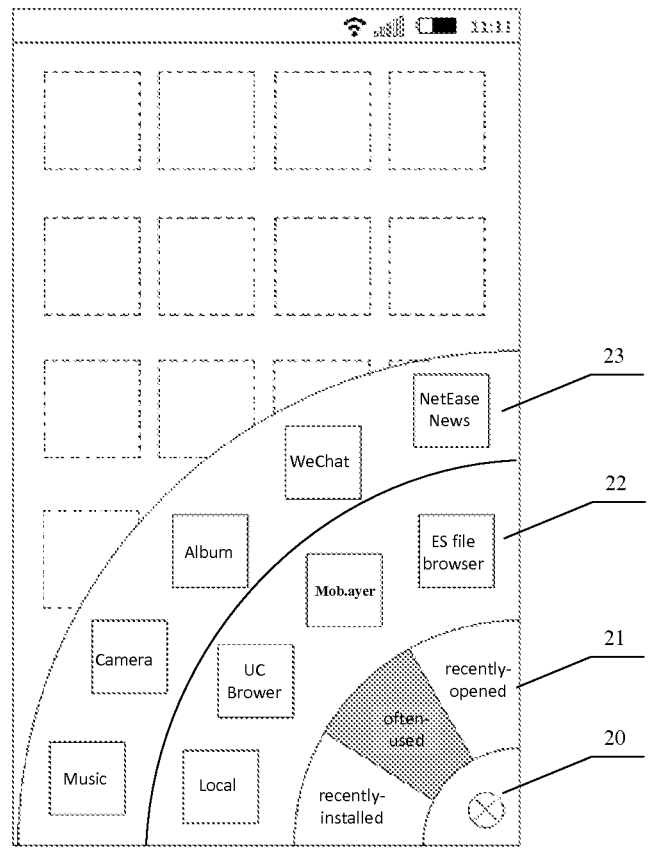
FIG. 4 is a schematic diagram showing the displaying of UI elements in a user interface according to one embodiment of the present invention.

Next, display position(s) of one or more user interface elements may be calculated, and the UI element(s) may be presented in the valid region of each layer of response region. FIG. 4 is a schematic diagram showing the display of UI elements in the user interface according to one embodiment of the present invention. As shown in FIG. 4, a close UI element for realizing a UI closing function is presented in the valid region of the $1^{st}$ layer of response region. When the user clicks the close UI element, the entire UI interface will be closed. A plurality of tag elements are presented in the valid region of the $2^{nd}$ layer of response region, which are "recently-opened", "often-used" and "recently-installed" respectively. The three tag elements correspond to three sub-classes, which are "most-recently-opened", "most-often-used" and "most-recently-installed" respectively. The "most-recently-opened", based on statistical data of a desktop, extracts a top 9 (of course, more or less than 9 may be also possible) of applications in a sequence of last use time. The "most-often-used", based on statistical data of desktop, extracts a top 9 of applications in a sequence of use frequency from high to low. The "most-recently-installed", based on data provided by a system database (of the mobile device), extracts a top 9 of applications in a sequence of update time.

According to one embodiment of the present invention, a Section class is used to provide an application list corresponding to the tags. The Section class is an abstract class which realizes abstract interface by sub-classes to provide data and accomplish specific service logic. A parent class of the Section class is java.lang.Object, and its sub-class includes RecentlyInstalledSection, MostUsedSection and RecentUsedSection. The structure of the Section class could be seen in the following tables 1.1, 1.2 and 1.3.

TABLE 1.1

Constant

| Type | Name | Description |
| --- | --- | --- |
| int | MAX_COUNT | maximum number of applications for a tag |

TABLE 1.2

Variable

| Type | Name | Description |
| --- | --- | --- |
| protected ArrayList<T> | mContent | Cache of application list corresponding to a tag |

TABLE 1.3

| Interface |
| --- |
| public boolean isEmpty( )<br>Description: whether this tag is a null tag (the number of applications is 0)<br>Parameter: none<br>Return value: boolean value, wherein true indicates the number of applications corresponding to the tag is equal to 0; and false indicates the number of applications corresponding to the tag is not equal to 0<br>public abstract ArrayList<T> loadIcons(Context context)<br>Description: loading application list corresponding to the tag, and the interface is an abstract interface; specific loading logic is implemented by sub-classes.<br>Parameter: context: Android system variable<br>Return value: application list<br>public abstract String getSectionName( )<br>Description: acquiring a name of the tag and an abstract interface, and returning, by the sub-class, a specific name, for example, MostUsedSection returns "most-often-used", RecentUsedSection returns "most-recently-opened" and RecentlyInstalledSection returns "most-recently-installed"<br>Parameter: none<br>Return value: name of the tag |

The applications as mentioned in the tables can be specified by an AppInfo interface type. The AppInfo may be provided by a 360 Mobile Phone Desktop, a main method of which includes getTitle( ) and getIcon( ) which mean to get a title and an icon of an application.

As shown in Table 1.3, an interface mainly realized by the sub-classes of the Section class is the abstract interface loadIcons( ) For example, the sub-class providing data of "most-recently-installed" is RecentlyInstalledSection, which realizes the loadIcons( ) interface by: acquiring all the installed applications firstly, and ordering in a sequence according to update time (lastUpdateTime field provided by the system) of the applications, extracting a top 9 (which is merely exemplary and can be varied depending on actual condition) of the ordered applications; if less than 9, extracting all the applications. The sub-class providing data of "most-often-used" is MostUsedSection, which realizes the loadIcons( ) interface by: acquiring all the installed applications, and ordering in a sequence according to use frequency (calledNum field, statistical data of a desktop and added by 1 each time of opening an application), extracting a top 9 of the ordered applications; if less than 9, extracting all the applications. The sub-class providing data of "most-recently-used" is RecentUsedSection, which realizes the loadIcons( ) interface by: acquiring all the installed applications, and ordering in a sequence according to last use time (lastCalledTime field, statistical data of a desktop and updated to a current time each time of opening an application), extracting a top 9 of the ordered applications; if less than 9, extracting all the applications. In the valid regions of the $3^{rd}$ and the $4^{th}$ layers of response region, it may be presented a plurality of application icon elements which are icons of the applications counted by the sub-class corresponding to the current tag element. Taking FIG. 4 as an example, in the valid region of the $2^{nd}$ layer of response region, the current tag element is "often-used", such that what represented in the $3^{rd}$ and the $4^{th}$ layers of response region present are icons of the top 9 of applications in a sequence of use frequency from high to low. It should be noted, although in the embodiment there are three tag elements presented in the valid region of the $2^{nd}$ layer of response region, it is possible to those of ordinary skills in this art that the number of tag elements could be more or less than three, the detailed description of which will be omitted herein for brevity.

Position(s) of UI element(s) may be calculated by a Positions class. The Positions class is a tool class responsible for calculating positions of all the UI elements and packs some general methods of calculating positions of UI elements. These methods are mathematical calculation methods, and all the interfaces of which are static interfaces. The Positions class has a Parent class java.lang.Object but none of direct or indirect sub-class. The structure of the Positions class could be seen in the following tables 2.1 and 2.2.

TABLE 2.1

| Constant | | |
| --- | --- | --- |
| Type | Name | Description |
| int | INNER_ITEMS_CAP | maximum number of UI elements a sector can hold |
| double | RADIAN | radian of a 90 degree angle |

TABLE 2.2

| Interface |
| --- |
| public static int[ ] getPosition(int index, int cap, int radius, boolean left)<br>Description: calculating the coordinates of the UI elements with specified block index value<br>Parameter:<br>index: block index value of the UI element<br>cap: maximum number of UI elements a UI element located region can hold<br>radius: preset radius of a region where the UI element is located<br>left: whether the sector is displayed on the left<br>Return value: Cartesian coordinates of the UI element, expressed by two-dimensional array<br>public static int[ ] getStartPosition(boolean left)<br>Description: calculating the coordinates of start point (origin) of an UI element animation<br>Parameter:<br>left: whether the sector is displayed on the left<br>Return value: Cartesian coordinates of the origin, expressed by two-dimensional array<br>public static double getRadian(int index, int cap)<br>Description: calculating a radian of the UI element with a specified block index value in the polar coordinate<br>Parameter:<br>index: block index value of the UI element within a certain region<br>cap: maximum number of UI elements the region can hold<br>Return value: radian of the UI element in the polar coordinate |

The coordinates calculated by the Position class may take the lower right corner of the screen (the lower left corner, the upper left corner, the upper right corner and a certain point of one side of the screen are also possible) as an origin, and the Position class also provides a transformation of the calculated coordinates and the system coordinates. In particular, according to a preset radius of each layer of response region and a block index value of the valid region of this layer of response region corresponding to the UI element, the position of the UI element presented in this layer of response region can be calculated, wherein the block index value is an index value of one of several blocks into which the valid region of the layer of response region is divided. Taking the $2^{nd}$ layer of response region as shown in FIG. 3 as an example, the valid region of the $2^{nd}$ layer of response region is divided into 3 blocks, wherein the block index value corresponding to "recently-opened" is 1, the block index value corresponding to "often-used" is 2 and the block index value corresponding to "recently-installed" is 3. Taking the calculation of the position of the UI element "often-used" as an example, with reference to the getRadian( ) interface in the table 2.2, first, the angle of the UI element position with respect to origin (such as, the lower right corner of the screen) is acquired firstly according to the block index value "2" of the valid region of the $2^{nd}$ layer of response region corresponding to the UI element; then, with reference to the getPosition( ) interface in the table 2.2, x and y coordinates of the UI element position is calculated according to the preset radius and the angle of the $2^{nd}$ layer of response region, whereby acquiring an exact position of the UI element. Assuming that the preset radius is r0 and the angle is θ, it can be calculated that x coordinate of the UI element position is r0*cos θ, and y coordinate is r0*sin θ. Herein, the preset radius of the $2^{nd}$ layer of response region is a value interposed between r and R. In the same manner, the display positions of all the UI elements can be calculated and the respective UI elements can be presented in respective layers of the sector regions of the sector UI. Since all the interfaces of the Position class are mathematical operations, it can be realized by using any programming languages.

After the UI elements are presented, the user may perform various trigger actions on the sector user interface. The mobile device may respond to the trigger actions correspondingly after detecting the trigger actions. The method for responding to events of the user interface of the mobile device will be explained in detail below by way of specific embodiments. Although the following embodiments are described based on the user interface as shown in FIG. 4, the present invention should not be limited thereto.

FIG. 5 is a flow chart schematically showing a method 500 for responding to events of a user interface of a mobile device according to one embodiment of the present invention. As shown in FIG. 5, the method 500 starts with step S501, that is, detecting a click action on the user interface (i.e., a first trigger action). Based on the user interface as shown in FIG. 4, the user may click the UI elements presented thereon, and the click action can be detected by the mobile device.

Following step S501, the method 500 goes to step S502, that is, calculating coordinates of the position upon click. The coordinates of the position upon click refers to coordinates with respect to a coordinate system taking the lower right corner of the screen as an origin. However, after the user triggers a click action, usually, the system may automatically acquire the coordinates of the position upon click with respect to the coordinate system taking the upper left corner of the screen as an origin (i.e., the system coordinate system). Therefore, it is required to transform the coordinates.

Following the step S502, the method 500 goes to step S503, that is, according to the coordinates of the position upon click, determining that the response region to which the position upon click belongs is the ith to the nth layers of response region. If the position upon click does not belong to the ith to the nth layers of response region, the method will not respond to the click action and go to the end; if the position upon click belongs to the ith to the nth layers of response region, the method 500 goes to step S504.

In step S504, it may determine whether the position upon click belongs to the valid region of the ith layer of response region, and if yes, go to step S506; otherwise, go to step S505. This step may be performed circularly. Since the basic unit of the UI element in the Android system is called as the view which responds to the trigger action as a whole. However, the view per se is formed into a rectangular shape, which has a portion not overlapping with the sector region. Therefore, it is required to shield this portion from responding to the trigger action and only allow the sector region to respond to the trigger action, so as not to affect responses of other views. Taking FIG. 3 as an example, only when the position where the trigger action occurs belongs to the valid region 32 of the $2^{nd}$ layer of response region, it may respond to the trigger action in the $2^{nd}$ layer of response region.

Figure 6:
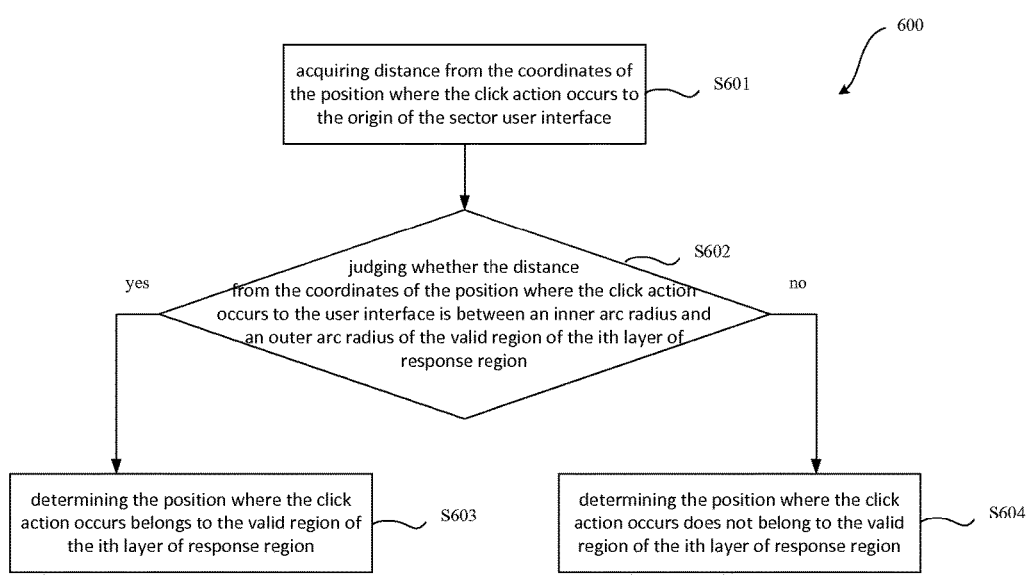
FIG. 6 is a flow chart schematically showing an implementation method of step S504 in FIG. 5.

FIG. 6 is a flow chart schematically showing an implementation method 600 of step S504 in FIG. 5. Optionally, the step S504 may include the following steps S601-S604. This method 600 starts with the step S601, that is, acquiring distance from the coordinates of the position upon click to the origin of the sector user interface. In this application, the origin of the sector user interface is an end point of a corner where the n layers of response region overlap or a central point of one side edge where the n layers of response region overlap. In FIG. 4, the origin of the user interface is the lower left end point of the screen.

Subsequently, according to the distance from the coordinates of the position upon click to the origin of the sector user interface, it may judge whether the position upon click belongs to the valid region of the ith layer of response region.

In particular, following step S601, the method 600 goes to the step S602, that is, determining whether the distance from the coordinates of the position upon click to the user interface is between an inner arc radius and an outer arc radius of the valid region of the ith layer of response region, and if yes, go to the step S603; otherwise, go to the step S604. As shown in FIG. 3, the valid region of response region may have an inner arc radius r and an outer arc radius R. For the valid region of the $1^{st}$ layer of response region, the inner arc radius is 0 and the outer arc radius is the radius of the sector region. For each of the valid regions of the $2^{nd}$ to the nth layers of response region, the inner arc radius is the inner radius of the annulus sector region, and the outer arc radius is the outer radius of the annulus sector region.

In the step S603, it may determine that the position upon click belongs to the valid region of the ith layer of response region, and the method 500 goes to step S506.

In the step S604, it may determine the position upon click does not belong to the valid region of the ith layer of response region, and the method 500 goes to step S505.

In the step S505, it may update i to i+1, and the method 500 goes to the step S504. That is, if the position upon click does not belong to the valid region of the ith layer of response region, it may in turn judge whether the position upon click belongs to the valid region of the i+1th layer of response region.

In the step S506, it may respond to the click action in the ith layer of the response region. Taking FIG. 4 as an example, a close user interface element for realizing a sector user interface closing function is presented in the valid region of the $1^{st}$ layer of response region. If it is judged that the position upon click belongs to the valid region of the $1^{st}$ layer of response region, this step may particularly include a step of closing the sector user interface.

If it is judged that the position upon click belongs to one of the valid regions of the $2^{nd}$ to the nth layers of response region, then it is necessary to determine a first block index value in the valid region of this layer of response region corresponding to the position upon click, so as to respond to the click action according to the first block index value. The specific process may include: according to the coordinates of the position upon click, acquiring an angle of the position upon click with respect to the origin of the user interface; and then according to the angle of the position upon click with respect to the origin of the user interface, searching for the first block index value in the valid region of the ith layer of response region corresponding to the click action and responding to the click action according to the first block index value. Herein, the first block index value refers to an index value of one of several blocks into which the valid region of the ith layer of response region is divided. Inside the mobile device system, it may maintain a mapping relation table between the first block index value and an angular range. By determining the angular range to which the angle of the position upon click with respect to the origin of the user interface belongs, the mapping relation table can be searched to obtain the first block index value in the valid region of the ith layer of response region corresponding to the click action. Taking the $2^{nd}$ layer of response region in FIG. 4 as an example, since there are 3 tag elements in the valid region of this layer of response region, it is necessary to determine the tag element which the user clicked. First, according to the coordinates of the position upon click, it may acquire the angle of the position upon click with respect to the origin of the sector user interface; then judge the preset angular range to which the angle of the position upon click with respect to the origin of the sector user interface belongs. If the angle belongs to a first angular range, for example [90°, 120°), it may determine that the first block index value corresponding to the position upon click is 1 by searching the mapping relation table; if the angle belongs to a second angular range, for example [120°, 150°), it may determine that the first block index value corresponding to the position upon click is 2 by searching the mapping relation table; if the angle belongs to a third angular range, for example [150°, 180°], it may determine that a second block index value corresponding to the position upon click is 3 by searching the mapping relation table; and finally it may respond to the touch click event based on the second block index value.

According to one embodiment of the invention, in FIG. 4, the valid region of the $2^{nd}$ layer of response region presents a plurality of tags elements, and the valid regions of the $3^{rd}$ and the $4^{th}$ layer of response region present a plurality of application icon elements respectively. Herein, the application icon element refers to an application icon used to activate an application of the mobile device. If it is judged that the position upon click belongs to the valid region of the $2^{nd}$ layer of response region, responding to the click action may further include the following step of:

1). placing all the application icon elements of the tag element corresponding to the above determined first block index value into a next application icon layer. IconLayer is an application icon layer, in charge of generation, caching, event processing and interactive animation of an icon. This method defines two IconLayers, which are next application icon layer (Next_IconLayer) and current application icon layer (Current_IconLayer) respectively. Assuming that the first block index value corresponding to the position upon click is 2, the tag element corresponding to this first block index value would be "often-used". Based on statistical data of the desktop, the system extracts a top 9 of applications in a sequence of use frequency from high to low. The application icon elements of these 9 applications may be placed into the next application icon layer.

2). removing all the application icon elements in the current application icon layer, and by carrying out rotation and fade-out animation methods, removing the plurality of application icon elements presented in the valid region of each of the $3^{rd}$ to the nth layers of response region from the screen. The application icon elements in the current application icon layer are those presented in the valid regions of the $3^{rd}$ and the $4^{th}$ layers of response region before the click action occurs, and the application icon elements in the current application icon layer are removed. By carrying out the rotation and fade-out animation methods, the application icon elements in the valid regions of the $3^{rd}$ and the $4^{th}$ layers of response regions are removed from the screen.

3). moving all the application icon elements in the next application icon layer into the current application icon layer, and by carrying out the rotation and fade-in animation methods, presenting the application icon elements in the current application icon layer on the screen.

A switch of tags can be realized by the above steps 1), 2) and 3), and visual effects provided for the user by the above switch would be that: while all the application icons of an original tag rotates out of the screen relative to the centre of the sector, the application icons of a new tag rotates into the screen relative to the centre of the sector, thus realizing a smooth switch of the tags.

Further, in one embodiment of the present invention, the method may also provide a switch of tag indicators while realizing the switch of the tags, which in particularly includes: by carrying out the rotation animation method, moving the tag indicator in the valid region of the $2^{nd}$ layer of response region to a position of the tag element corresponding to the first block index value corresponding to the position upon click in the valid region of the $2^{nd}$ layer of response region. Taking FIG. 4 as an example, assuming that before the click action occurs, the application icon element presented in the valid regions of the $3^{rd}$ and the $4^{th}$ layers of response region is an application corresponding to "recently-installed", the tag indicator (grey area) should be at "recently-installed". After the click action occurs, the tag corresponding to the position upon click is "often-used". At this time, the rotation animation method is carried out to clockwise rotate by 30 degree taking the lower right corner as a centre, and the tag indicator (grey area) in the valid region of the $2^{nd}$ layer of response region is moved to "often-used" (see FIG. 4).

If it is judged that the position upon click belongs to one of the valid regions of the $3^{rd}$ to the nth layers of response region and it is already determined that the position upon click corresponds to the first block index value in the valid region of this layer of response region, then responding to the click action may in particular include: opening the application corresponding to the application icon element which corresponds to the first block index value. Taking FIG. 4 as an example, if it is judged that the position upon click belongs to the valid regions of the $4^{th}$ layer of response region and it is already determined that the first block index value corresponding to the position upon click in the valid regions of the $4^{th}$ layer of response region is 2 (corresponding to the block of "WeChat" in this embodiment), responding to the click action may in particular include: opening the application of "WeChat". Thereby, it is possible to realize an opening of the application corresponding to the application icon element in the user interface.

Figure 7:
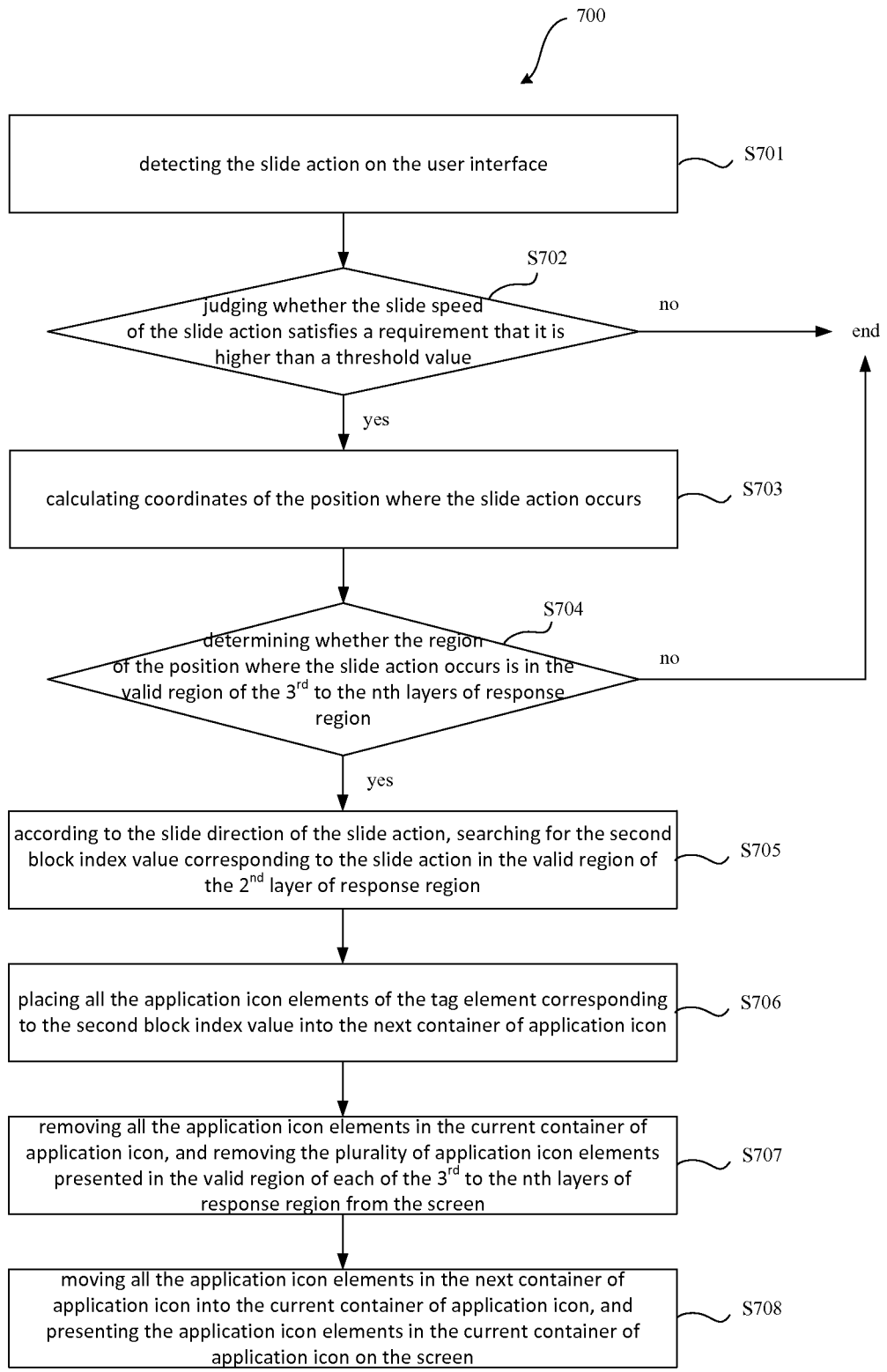
FIG. 7 is a flow chart schematically showing a method for responding to a sliding action by a user interface according to one embodiment of the present invention.
Figure 8:
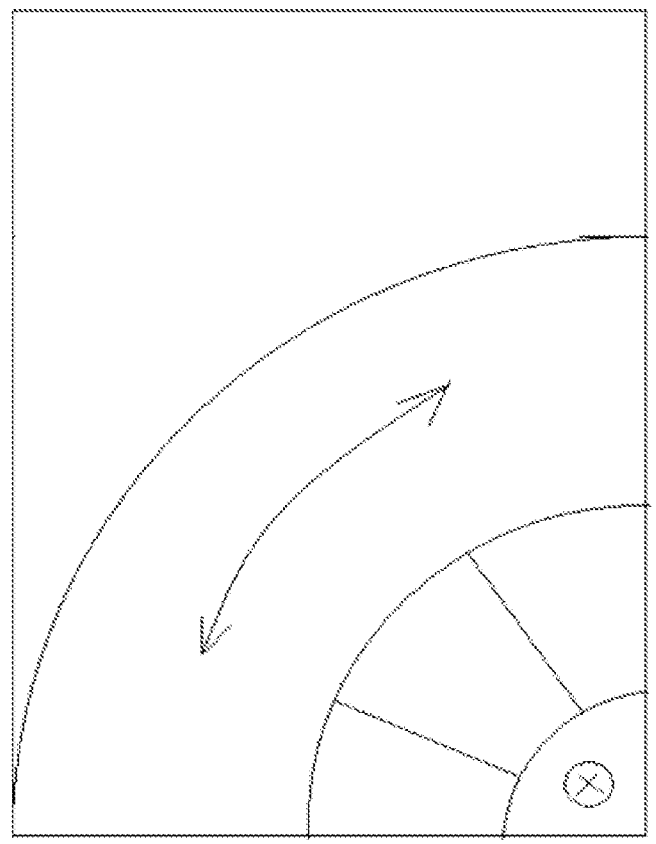
FIG. 8 is a schematic diagram showing a sliding action activated by a user in one embodiment of the present invention.

Further, the $3^{rd}$ to the nth layers of response region in this embodiment may respond to a sliding action (i.e., the second trigger action) other than the click action. FIG. 7 is a flow chart schematically showing a method 700 of responding to a sliding action by the user interface according to one embodiment of the present invention. As shown in FIG. 7, the method 700 starts with step S701, that is, detecting the sliding action on the user interface. FIG. 8 is a schematic diagram showing a sliding action activated by a user in one embodiment of the present invention. As shown in FIG. 8, the user may perform a sliding action in the valid region in any one of the $3^{rd}$ to the nth layers of response region, and the mobile device may determine the sliding action by acquiring a speed and direction of the sliding action by the user on the screen.

Optionally, following the step S701, the method 700 goes to step S702, that is, determining whether the slide speed of the sliding action satisfies a requirement that it is higher than a predefined threshold value, if yes, the method 700 goes to step S703; otherwise, the method 700 ends. In particular, the mobile device may acquire a horizontal slide speed and/or a vertical slide speed of the sliding action, and if any one of the speeds is higher than the predefined threshold value, then the requirement is considered to be satisfied. By judging the slide speed, misoperation may be prevented accordingly.

Subsequently, the method 700 goes to the step S703, that is, calculating coordinates of the sliding action occurring position. In particular, the mobile device may acquire start point coordinates and end point coordinates of the sliding action.

Subsequently, the method 700 proceeds with step S704, that is, according to the coordinates of the sliding action occurring position, determining whether the region of the sliding action occurring position belongs to the valid region of the $3^{rd}$ to the nth layers of response region. Generally, if it is judged that the start point coordinates and the end point coordinates of the sliding action are both in the valid region of the $3^{rd}$ to the nth layers of response region, then it may determine that the region of the sliding action occurring position belongs to the valid regions of the $3^{rd}$ to the nth layers of response regions, and the method 700 goes to step S705; otherwise, it may determine that the region of the sliding action occurring position does not belong to the valid region of the $3^{rd}$ to the nth layers of response region, then no response is made to the sliding action, and the method 700 ends.

In the step S705, according to the slide direction of the sliding action, it may search for the second block index value corresponding to the sliding action in the valid region of the $2^{nd}$ layer of response region. Assuming that the slide speed of the sliding action has components of vx and vy in x and y directions respectively, a speed vector can be indicated by (vx, vy). The slide direction of the sliding action can be determined by a quadrant where the speed vector is positioned, and the quadrant where the speed vector is positioned can be determined by plus and minus signs of vx and vy. If the speed vector is in the first quadrant, then the slide direction would be toward the upper right; and if the speed vector is in the third quadrant, then the slide direction would be toward the lower left. The slide direction of the sliding action may be also determined based on a tangent value of the slide speed. The tangent value of the slide speed (i.e., vy/vx) may be used to calculate an angle according to an inverse trigonometric function, and the angle is in turn compared with a preset angle; or the tangent value of a preset angle may be calculated, and the tangent value of the preset angle is compared with the tangent value of the slide speed according to the monotonicity of a tangent function, whereby determining the slide direction. Taking FIG. 4 as an example, it is assumed that before the sliding action occurs, the valid regions of the $3^{rd}$ and the $4^{th}$ layers of response region present an application icon element corresponding to "often-used", that is, the application icon element in the current application icon layer is/are the application icon element(s) corresponding to "often-used". After the sliding action occurs, if it is determined that the slide direction is toward upper right, that is, the user wants to rotate the application icon element corresponding to "recently-installed" into the screen, then it may be determined that the second block index value corresponding to the slide direction in the valid region of the $2^{nd}$ layer of response region is 3 (the block index value of the block where "recently-installed" is positioned); if it is determined that the slide direction is toward lower left, that is, the user wants to rotate the application icon element corresponding to "recently-opened" into the screen, then it may be determined that the second block index value corresponding to the slide direction in the valid region of the $2^{nd}$ layer of response region is 1 (the block index value of the block where "recently-opened" is positioned). If before the sliding action occurs, the valid regions of the $3^{rd}$ and the $4^{th}$ layers of response region present an application icon element corresponding to "recently-installed", and after the sliding action occurs, if it is determined that the slide direction is toward upper right, then it may be determined that the second block index value corresponding to the slide direction in the valid region of the $2^{nd}$ layer of response region is 1, that is, it may be activated to rotate the application icon element corresponding to "recently-opened" into the screen. Thereby, a circularly displaying effect would be present. In the same manner, if before the sliding action occurs, the valid regions of the $3^{rd}$ and the $4^{th}$ layers of response region present an application icon element corresponding to "recently-opened", and after the sliding action occurs, if it is determined that the slide direction is toward lower left, then it may be determined that the second block index value corresponding to the slide direction in the valid region of the $2^{nd}$ layer of response region is 3, that is, it may be activated to rotate the application icon element corresponding to "recently-installed" into the screen.

Following the step S705, the method 700 goes to step S706, that is, placing all the application icon elements of the tag element corresponding to the second block index value into the next application icon layer. According to the scheme as described above, this method defines two IconLayers, which are the next application icon layer (Next_IconLayer) and the current application icon layer (Current_IconLayer) respectively. Assuming that the second block index value corresponding to the slide direction of the sliding action in the valid region of the $2^{nd}$ layer of response region is 3, and the tag element according to the second block index value is "recently-installed", the mobile device may acquire the data provided by database to extract a top 9 of applications in a sequence of update time and place the applications icon elements of these 9 applications into the next application icon layer.

Subsequently, the method 700 goes to step S707, that is, removing all the application icon elements in the current application icon layer, and by carrying out the rotation and fade-out animation methods, removing the plurality of application icon elements presented in the valid region of each of the $3^{rd}$ to the nth layers of response region from the screen. The application icon elements in the current application icon layer are those presented in the valid regions of the $3^{rd}$ and the $4^{th}$ layers of response region before the sliding action occurs, and the application icon elements in the current application icon layer are removed. By carrying out the rotation and fade-out animation methods, the application icon elements in the valid regions of the $3^{rd}$ and the $4^{th}$ layers of response region are removed from the screen.

Subsequently, the method 700 goes to step S708, that is, moving all the application icon elements in the next application icon layer into the current application icon layer, and by carrying out the rotation and fade-in animation methods, presenting the application icon elements in the current application icon layer on the screen.

Through the above steps S701-708, it is possible to realize the response to the sliding action on the sector user interface, and the result of the response is the switch of the tags. The visual effects provided for the user by the above switch would be that, while all the application icons of the original tag rotates out of the screen relative to the centre of the sector, the application icons of the new tag rotates into the screen relative to the centre of the sector, thus realizing a smooth switch of the tags.

Further, the method may also provide a switch of tag indicator while realizing the switch of the tag, which in particularly includes: by carrying out the rotation animation method, moving the tag indicator in the valid region of the $2^{nd}$ layer of response region to a position of the tag element corresponding to the above second block index value.

The above described methods may relate to the following function classes:

(1) Popup Class

The Popup class is a root container of the user interface of the present invention, which provides activating and hiding of a rapid opening, and controls distribution of various actions. The Popup class inherits from android.widget.Framelayout, and has no sub-class. The structure of the Popup class could be seen in the following tables 3.1, 3.2 and 3.3.

TABLE 3.1

| Constant | | |
|---|---|---|
| Type | Name | Description |
| Int | DEFAULT_SECTION_COUNT | default number of tags |

TABLE 3.2

| Variable | | |
|---|---|---|
| Type | Name | Description |
| ActionSector | mActionSector | Container of tags and function buttons (currently, the UI closing element) |
| IconSector | mIconSector | Container of application icons |
| Int[ ] | mSectionRadius | Preset radius of the valid regions of the 4 layers of response region, stored in an int array |
| Section[ ] | mSections | Section class corresponding to the three tags, stored in an array |
| Boolean | isShowAtLeft | Display position, wherein "true" means lower left corner and "false" means lower right corner |

TABLE 3.3

Interface

Public static Popup pop(Launcher launcher, View root, boolean isLeft)
Description: activate the rapid opening
Parameter:
launcher: an instance of a main program object of desktop of the mobile device, used to load the resource and data required by the method;
root: parent container of the method;
isLeft: whether the rapid opening is displayed at the lower left corner
Return value: an instance of Popup object
Public void dismiss( )
Description: hide the rapid opening
Parameter: none
Return value: none
Void onSectionChanged(int from, int to)
Description: a Callback interface when switching the tags, which is capable of reading the data provided by the Section class and TABLE 3.3-continued Interface displaying icons by the IconSector
Parameter: from: a block index of previous tag; to: a block index of next tag
Return value: none
Void ChangeSection(boolean up)
Description: a Callback interface of a gesture switch tag, the function of which is the same as onSectionChanged(int, int)
Parameter: up: whether it is a upward gesture
Return value: none
Void onActionSectorPopup( )
Description: a Callback interface after activating the ActionSector, which performs operations of activating the IconSector and loading the corresponding tag data.
Parameter: none
Return value: none
Boolean onBackPressed( )
Description: a processing logic of pressing a backspace button, which currently is to close the rapid opening
Parameter: none
Return value: a boolean value, wherein "true" means the event has been processed, and "false" means the event has not been processed yet (2) ActionSector Class The ActionSector class is a container of the tags and the function buttons (according to an example of the present invention, a UI closing element) of the user interface of the method. The ActionSector class inherits from android.widget.Framelayout, realizes android.view.animation.Animation.AnimationListener and has no sub-class. The specific structure of ActionSector class could be seen in the following tables 4.1, 4.2 and 4.3.

TABLE 4.1

| Constant | | |
|---|---|---|
| Float[ ] | TANGENTS | preset tangent value array |

TABLE 4.2

| Variable | | |
|---|---|---|
| Type | Name | Description |
| View | mInner | Valid region of the $1^{st}$ layer of response region |
| View | mOuter | Valid region of the $2^{nd}$ layer of response region |
| View | mClose | UI closing element |
| View | mSectionIndicator | Tag indicator |
| Float | mTouchX | X coordinate of position where a finger currently touching |
| Float | mTouchY | Y coordinate of position where a finger currently touching |
| Int | mCurrentSection | Block index of current tag |
| Int | mNextSection | Block index of next tag |
| Boolean | isShowAtLeft | Whether it is displayed at lower left corner |

TABLE 4.3

Interface

Void pop( )
Description: activate ActionSector
Parameter: none
Return value: none
Void pull( )
Description: retract ActionSector
Parameter: none
Return value: none TABLE 4.3-continued Interface Void adjustSections( )
Description: calculate and adjust the position of each tag
Parameter: none
Return value: none
Public boolean onTouchEvent(MotionEvent event)
Description: process the trigger action and is an onTouchEvent method
of Override parent class
Parameter: event: information of current trigger action, wherein
MotionEvent class is a package class for the trigger action by the
Android system
Return value: boolean value, wherein "true" means the event has
been processed in the current layer, and "false" means the event
has not been processed and is transferred to next layer to be processed
Void changeSection(int from, int to, boolean anim)
Description: switch the tags
Parameter: from: block index of previous tag; to: block index of next
tag; anim: whether the animation is performed (if not performed, it is
shown the tag indicator is instantaneously moved to the corresponding
position; otherwise the tag indicator will be rotated to corresponding
position)
Return value: none
Public void onAnimationStart(Animation anim)
Description: abstract method for implementing the AnimationListener
interface, which is a Callback interface when the Android system starts
to perform the animation and which could not be used in this method and
is null
Parameter: anim: animation for calling the Callback interface
Return value: none
Public void onAnimationRepeat(Animation anim)
Description: abstract method for realizing the AnimationListener
interface, which is a Callback interface when the Android system repeats
to perform the animation and which could not be used in this method and
is null
Parameter: anim: animation for calling the Callback interface
Return value: none
Public void onAnimationEnd(Animation anim)
Description: abstract method for realizing the AnimationListener
interface, which is a Callback interface when the Android system finish
the animation, and in this method, the ActionSector may call back the
onSectorPopup interface of the Popup
Parameter: anim: animation for calling the Callback interface
Return value: none (3) IconSector Class The IconSector class is a container of displaying application icons in this method. The IconSector class inherits from android.widget.FrameLayout and has no sub-class. The specific structure of IconSector class could be seen in the following tables 5.1 and 5.2.

TABLE 5.1

Variable

| Type | Name | Description |
| --- | --- | --- |
| View | mInner | Region where icons of inner layer are positioned |
| View | mOuter | Region where icons of outer layer are positioned |
| IconLayer | mCurrentLayer | Container of the application icon of current tag |
| IconLayer | mNextLayer | Container of the application icon of the tag need to switch to |
| Boolean | isShowAtLeft | Whether it is displayed at lower left corner |
| VelocityTracker | mVelocityTracker | Velocity calculating class built in Android |
| Int | mMinFlingVelocity | Velocity threshold |

TABLE 5.2

Interface

Void popIcons(ArrayList<AppInfo>icons)
Description: activate the application icon corresponding to the tag,
which is accomplished by calling an interface corresponding to the
IconLayer
Parameter: Icons: list of application icons corresponding to a certain tag
Return value: none
Void popBackground( )
Description: activate a corresponding sector background according to the
number of icons; for example, in the case that the number of icons is
more
than 4, activate a relatively larger sector background, and otherwise,
activate a relatively smaller sector background
Parameter: none
Return value: none
Void pull( )
Description: retract the application icon
Parameter: none
Return value: none
Void changeSection(int delta)
Description: switch the tags, which represents that all the application
icons of current tag rotate out of the screen and application icons of next
tag rotate into the screen
Parameter: delta: a difference value between the block index values of two
tags, plus and minus signs of which could be used to judge the direction
Return value: none
Public boolean onTouchEvent(MotionEvent event)
Description: interface of Override parent class, which is used to process
the trigger action
Parameter: event: information of current trigger time, wherein
MotionEvent is a package class for the trigger action by the Android
system
Return value: boolean value, wherein "true" means the event has
been processed, and "false" means the event has not been
processed and is transferred to next layer to be processed (4) IconLayer Class The IconLayer class is a direct container of the application icons, responsible for calculating the position of icon, processing the click action on the icon and performing the animation of the tag switch as a whole. The IconLayer class inherits from android.widget.FrameLayout, implements android.view.View.OnClickListener and android-.view.View.OnLongClickListener, and has no sub-class. The specific structure of IconLayer class could be seen in the following tables 6.1 and 6.2.

TABLE 6.1

Variable

| Type | Name | Description |
| --- | --- | --- |
| ArrayList<View> | mIcons | List of application icons |
| Boolean | isShowAtLeft | Whether it is displayed at lower left corner |

TABLE 6.2

Interface

Void popIcons(ArrayList<AppInfo>icons, int[ ] startPosition, boolean
anim)
Description: activate the application icon
Parameter: Icons: list of applications; startPosition: the coordinates of
origin, which is a two-dimensional array; anim: whether the animation is
performed, wherein, in consideration of performance, perform the
animation only for the icon of current tag, but not for the icon of next tag
Return value: none
Void pullIcons(int[ ] endPosition)
Description: retract the application icon
Parameter: Icons: endPosition: the coordinates of origin, which is a
two-dimensional array TABLE 6.2-continued

| Interface |
|---|
| Return value: none |
| Private void adjustLayoutParams(View icon, int[ ] position) |
| Description: adjust the position of application icon, which is implemented by setting the variable value of the LayoutParams of the View |
| Parameter: Icon: application icon currently required to be adjusted; position: application icon position calculated by the Positions class, which is a two-dimensional array |
| Return value: none |
| Public void onClick(View view) |
| Description: abstract interface for implementing the OnListener and process the click action, wherein, in this method, if the click action occurs on an icon, then the corresponding application is opened; otherwise no operation is performed |
| Parameter: view: View object clicked by a finger |
| Return value: none |
| Public boolean onLongClick(View view) |
| Description: abstract interface for implementing OnLongClickListener and process a long-touch time, wherein, in this method, the operation of the phone desktop (professional version) of the mobile device is dragging the application icon, and the operation of beautifying desktop is positioning to the position of the application on the desktop |
| Parameter: view: View object of current long-touch by a finger |
| Return value: boolean value, wherein "true" means the event has been processed, and "false" means the event has not been processed |

(5) Animations Class

The Animations class is a tool class providing various animations required in this method. The Animations class inherits from java.lang.Object, and has no sub-class. The specific structure of Animations class could be seen in the following tables 7.1 and 7.2.

TABLE 7.1

| Constant | | |
|---|---|---|
| Type | Name | Description |
| Int | DURATION | Default duration of the animation |
| Int[ ] | START_OFFSETS | Delay amount array of start time of activating animation in each layer of region |
| Int[ ] | END_OFFSETS | Delay amount array of start time of retracting animation in each layer of region |
| Float[ ] | SECTOR_SCALES | Initial value of scale factor of scaling animation in each layer of region |
| Int | OFFSET_INTERVAL | Interval between the start time of activating and retracting animation of each element |

TABLE 7.2

| Interface |
|---|
| Static Animation getSectorPopAnimation(int index, boolean left) |
| Description: acquire the activating animation of a certain layer of region, wherein the animation is an animation of zooming in from a point |
| Parameter: index: an index of a layer of region; left: whether it is displayed at lower left corner |
| Return value: Animation object |
| static Animation getSectorPullAnimation(int index, boolean left) |
| Description: acquire the retracting animation of a certain layer of region, wherein the animation is an animation of zooming out to a point |
| Parameter: index: an index of a layer of region; left: whether it is displayed at lower left corner |
| Return value: Animation object |
| Static Animation getIconPopAnimation(int index, int[ ] from, int[ ] to, boolean instant) |
| Description: acquire the activating animation of a certain application icon, wherein the animation is a translating animation from the origin to end point |

TABLE 7.2-continued

| Interface |
|---|
| Parameter: Index: index of application icon; From: the origin; to: position of the end point calculated by the Positions class; instant: whether it is performed instantaneously; if true, then the duration of the animation is 0 (that is, the animation is finished instantaneously); otherwise, the duration of the animation is normal; in the consideration of the performance, when the activating icon do not belong to the current tag, this parameter is turned to true |
| Return value: Animation object |
| Static Animation getIconPullAnimation(int index int[ ] from, int[ ] to) |
| Description: acquire the retracting animation of a certain application icon, wherein the animation is a translating animation from current position to the origin |
| Parameter: Index: index of the application icon; From: initial point (that is, where the current icon is positioned); To: end point (that is, the origin) |
| Return value: Animation object |
| Static Animation getSectionIndicatorAnimation(int from, int to, boolean instant, boolean left) |
| Description: acquire an animation of tag indicator, wherein the animation is a rotary animation from the current tag to a target tag, with the origin as a centre |
| Parameter: From: index of the current tag; To: index of the target tag; Instant: whether it is performed instantaneously; if true, then the duration of the animation is 0; otherwise, the duration of the animation is normal; in the consideration of the performance, in the case of activating the rapid opening, this parameter is turned to true, and in other cases (for example, clicking to switch the tag), this parameter is turned to false |
| Return value: Animation object |
| Static Animation getIconLayerAnimation(int direction, boolean fade, boolean left) |
| Description: acquire an animation of IconLayer, wherein the animation is a rotary animation with the origin as a centre, and while the IconLayer corresponding to the current tag rotates out of the screen, a next tag to which the IconLayer corresponding rotates into the screen |
| Parameter: direction: a difference value between the indices of two tags, plus and minus signs of which could be used to judge an upward rotation or a downward rotation; fade: whether it rotates out of or into the screen; left: whether it is displayed at lower left corner |
| Return value: Animation object |

In the specific structures of the above-motioned classes, related terms will be explained as follows:

FrameLayout is a component provided by the Android system and is a container class of View, which may be arranged in laminated manner in the sequence of View added thereto, and which may adjust the position of display by setting margin and gravity attributes of LayoutParmas of the View.

android.view.animation.Animation.AnimationListener is an interface provided by Android animation frame and has three abstract methods, namely onAnimationStart, onAnimationRepeat and onAnimationEnd, which may be called back at the time of starting, repeating (if possible) and ending the animation, respectively.

MotionEvent class is a package class of the Android system to a trigger action, wherein several attributes of action (type of action, such as pressing, moving and releasing), x (x coordinate of the trigger action) and y (y coordinate of the trigger action), may be mainly used herein.

android.view.View.OnClickListener is an interface provided by the Android system to process a click action and has only one abstract method, namely onClick, which may be called back at the time of clicking by a finger; android.view.View.OnLongClickListener is an interface provided by the Android system to process a long-press event and has only one abstract method, namely onLongClick, which may be called back at the time of long-pressing the screen.

LayoutParams class is a package class of layout parameters of View provided by the Android system, wherein different containers may provide respective LayoutParams sub-classes, and LayoutParams provided by FrameLayout used in this method mainly uses two attributes, namely margin and gravity, which indicate margin distance and alignment manner (in this method, for example, bottom I left is used for lower left corner, denoting that all the Views are aligned with the lower left corner, and bottom I right is used for lower right corner, denoting that all the Views are aligned with the lower right corner), respectively.

Animation class is a parent class of all the animations in Android animation frame, wherein some of its sub-classes may be used in this method, such as TranslateAnimation, AlphaAnimation, ScaleAnimation and RotateAnimation.

The method for responding to events of the sector user interface, according to the above-discussed embodiments, may implement responding to the user's trigger action in an order of priority of various response regions of the sector user interface for responding to an event. Taking the click action as an example, after a click action on the user interface is detected, coordinates of the position upon click may be calculated and the layer of response region where the click action occurs may be determined on the basis of the coordinates. Since response region is formed into a rectangular shape and the n layers of response region overlap at one of their corners or edges and increase sequentially, if the position upon click is in the ith layer of response region, it is necessarily in the i+1th to the nth layers of response region. On the ground of this, the method may first judge whether the position upon click is in the valid region of the ith layer of response region; if no, it may in turn judge whether the position upon click is in the valid region of the i+1th layer of response region. That is, the order of the priority of the ith to the nth layers of response region for responding to the event is from high to low. With this method, the mobile device is able to exactly respond to the user's operations on the sector user interface.

In this method, the sector user interface may provide the user with a convenient access to opening an application corresponding to the UI element. This access is global, which may solve a problem that it is difficult for the user to search applications when using a smart terminal. Further, the mobile device would not display the sector user interface until the user triggers a sector user interface activating instruction, so as to provide a convenient and flexible activation, without affecting operations of other applications and aesthetics of the entire user interface. The sector user interface may comprise n layers of the sector region, each of which can present one or more UI element so as to provide a number of applications. By judging the response region and gestures, the method may provide for the user a number of gesture operations such as a slide for activating the interface, a touch for clicking, a slide for switching the tags, a click for opening application and the like.

In this method, the $2^{nd}$ layer of the sector region of the sector user interface may present a plurality of tag elements, each of which corresponds to the same kind of applications, so as to specifically provide the user with various kinds of applications, satisfy the user's requirement on searching applications, facilitate the search manners and improve the efficiency of search. Main interface of the sector user interface may be displayed at the lower right (lower left) of the screen, such that the user may manipulate the sector user interface using a single thumb, and both of right and left hands could be used. Further, in this method, the sector user interface and UI elements could be displayed in a plurality of animation effects and provide a fluent UI interaction for the user.

Figure 9:
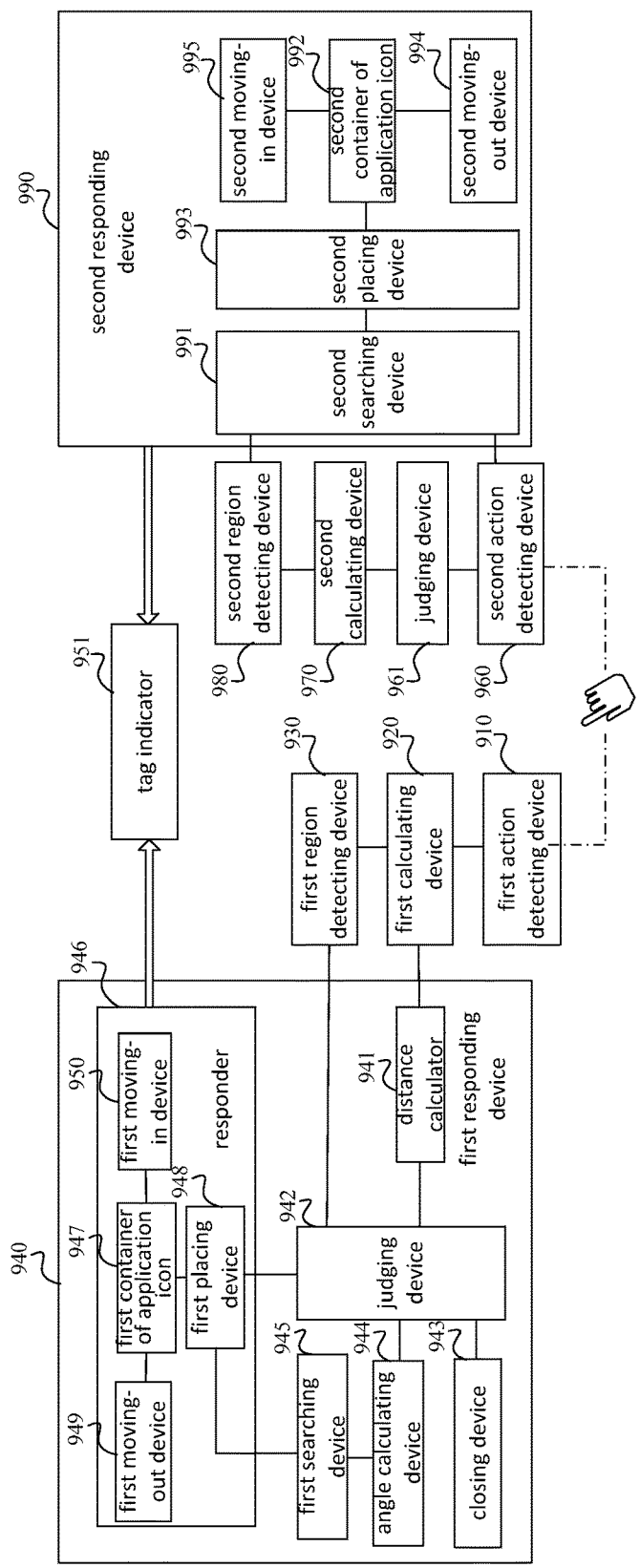
FIG. 9 is a structural block diagram schematically showing a mobile device according to one embodiment of the present invention.

FIG. 9 is a structural block diagram schematically showing a mobile device according to one embodiment of the present invention. A user interface is presented on a screen of the mobile device and comprises n layers of a response region, wherein the response region is a transparent rectangle, and the n layers of response region overlap at one of their corners or edges, wherein the mth layer of response region is larger than the m−1th layer of response region, m∈[2, n]; a valid region of the 1st layer of response region is a sector region, and valid regions of the 2nd to the nth layers of response region are annulus sector regions. As shown in FIG. 9, the mobile device may comprise: a first action detecting device 910, a first calculating device 920, a first region detecting device 930 and a first responding device 940.

The first action detecting device 910 is configured to detect a first trigger action on the user interface. Taking a click action as an example of the first trigger action (hereinafter, description will be provided by way of taking the click action as an example), based on the user interface as shown in FIG. 4, the user may click on UI elements presented thereon, and the first action detecting device 910 may detect the click action.

The first calculating device 920 is configured to calculate coordinates of the position where the first trigger action (click action) occurs. The coordinates of the position upon click refer to coordinates with respect to a coordinate system taking lower right corner of the screen as an origin. However, after the user triggers a click action, usually, the system may automatically acquire the coordinates of the position upon click with respect to the coordinate system taking upper left corner of the screen as an origin (i.e., the system coordinate system). Therefore, it is required for the first calculating device 920 to transform the coordinates.

The first region detecting device 930 is configured to, according to the coordinates of the position where the first trigger action occurs, determine the response region to which the position where the first trigger action occurs belongs is the ith to the nth layers of response region, wherein i∈[1, n]. If the first region detecting device 930 determines that the position upon click does not belong to the ith to the nth layers of response region, the mobile device may not respond to the click action; if the first region detecting device 930 determines that the position upon click belongs to the ith to the nth layers of response region, the first responding device 940 may be activated.

The first responding device 940 is configured to determine whether the position where the first trigger action occurs belongs to the valid region of the ith layer of response region, and if yes, respond to the first trigger action in the ith layer of response region; otherwise, update i to i+1 and repeat this process until i is equal to n+1. Since the basic unit of the UI element in the Android system is called as the view which responds to the trigger action as a whole. However, the view per se is formed into a rectangular shape, which has a portion not overlapping with the sector region. Therefore, it is required to shield this portion from responding to the trigger action and only allow the sector region to respond to the trigger action, so as not to affect responses of other views. Taking FIG. 3 as an example, only when the position where the trigger action occurs belongs to the valid region 32 of the $2^{nd}$ layer of response region, it may respond to the trigger action in the $2^{nd}$ layer of response region.

Optionally, the first responding device 940 may comprise a distance calculator 941 and a judging device 942.

The distance calculator 941 is configured to acquire distance from the coordinates of the position where the first trigger action occurs to an origin of the user interface.

The judging device 942 is configured to, according to the distance from the coordinates of the position where the first trigger action occurs to the origin of the user interface, judge whether the position where the first trigger action occurs belongs to the valid region of the ith layer of response region. Optionally, the judging device 942 is further configured to judge whether the distance from the coordinates of the position where the first trigger action occurs to the origin of the user interface is between an inner arc radius and an outer arc radius of the valid region of the ith layer of response region, if the judgement result is yes, determine that the position where the first trigger action occurs belongs to the valid region of the ith layer of response region. Herein, for the valid region of the $1^{st}$ layer of response region, the inner arc radius is 0 and the outer arc radius is the radius of the sector region; for each of the valid regions of the $2^{nd}$ to the nth layers of response region, the inner arc radius is the inner radius of the annulus sector region, and the outer arc radius is the outer radius of the annulus sector region.

The first responding device 940 may further comprise: a closing device 943, configured to, if it is judged that the position where the first trigger action occurs belongs to the valid region of the $1^{st}$ layer of response region, close the user interface. Taking FIG. 4 as an example, a close UI element for implementing a sector user interface closing function is presented in the valid region of the $1^{st}$ layer of response region; if it is judged that the position upon click belongs to the valid region of the $1^{st}$ layer of response region, the closing device 943 may close the sector user interface.

The first responding device 940 may further comprise: an angle calculating device 944, a first searching device 945 and a responder 946. If it is judged that the position where the first trigger action occurs belongs to one of the valid regions of the $2^{nd}$ to the nth layers of response region, then the angle calculating device 944 may be configured to, according to the coordinates of the position where the first trigger action occurs, acquire an angle of the position where the first trigger action occurs with respect to the origin of the user interface. The first searching device 945 may be configured to, according to the angle of the position where the first trigger action occurs with respect to the origin of the user interface, search for a first block index value in the valid region of the ith layer of response region corresponding to the first trigger action. Herein, the first block index value refers to an index value of one of several blocks into which the valid region of the ith layer of response region is divided. A mapping relation table between the first block index value and an angular range may be maintained inside the mobile device system. By determining the angular range to which the angle of the position upon click with respect to the origin of the user interface belongs, the first searching device 945 may search the mapping relation table to obtain the first block index value in the valid region of the ith layer of response region corresponding to the click action. The responder 946 may be configured to respond to the first trigger action according to the first block index value. Taking the $2^{nd}$ layer of response region in FIG. 4 as an example, since there are 3 tag elements presented in the valid region of this layer of response region, it is necessary to determine the tag element which the user clicked. First, according to the coordinates of the position upon click, the angle calculating device 944 may acquire the angle of the position upon click with respect to the origin of the sector user interface; then the first searching device 945 may judge the preset angular range to which the angle of the position upon click with respect to the origin of the sector user interface belongs. If the angle belongs to a first angular range, for example [90°, 120°], it may determine that the first block index value corresponding to the position upon click is 1 by searching the mapping relation table; if the angle belongs to a second angular range, for example [120°, 150°], it may determine that the first block index value corresponding to the position upon click is 2 by searching the mapping relation table; if the angle belongs to a third angular range, for example [150°, 180°], it may determine that a second block index value corresponding to the position upon click is 3 by searching the mapping relation table; and finally the responder 946 may respond to the touch click event based on the second block index value.

Further, the responder 946 may comprise: a first container of application icon 947, a first placing device 948, a first moving-out device 949 and a first moving-in device 950. In particular, in FIG. 4, the valid region of the $2^{nd}$ layer of response region presents a plurality of tags elements, and the valid regions of the $3^{rd}$ and the $4^{th}$ layer of response region present a plurality of application icon elements respectively. Herein, the application icon elements refer to application icons used to activate applications of the mobile device. If it is judged that the position upon click belongs to the valid region of the $2^{nd}$ layer of response region, the first placing device 948 may be configured to place all the application icon elements of the tag element corresponding to the first block index value into a next first container of application icon; the first moving-out device 949 may be configured to remove all the application icon elements in a current first container of application icon, and remove the plurality of application icon elements presented in the valid region of each of the $3^{rd}$ to the nth layers of response region from the screen; the first moving-in device 950 may be configured to move all the application icon elements in the next first container of application icon into the current first container of application icon, and present the application icon elements in the current first container of application icon on the screen. A switch of tags can be realized by these functional modules, and visual effects provided for the user by the above switch would be that, while all the application icons of the original tag rotates out of the screen relative to the centre of the sector, the application icons of the new tag rotates into the screen relative to the centre of the sector, realizing a smooth switch of the tags.

Moreover, the mobile device may further comprise: a tag indicator 951 which is presented in the valid region of the $2^{nd}$ layer of response region. The tag indicator 951 is moved to a position of the tag element corresponding to the first block index value in the valid region of the $2^{nd}$ layer of response region corresponding to the position where the first trigger action occurs. Taking FIG. 4 as an example, assuming that before the click action occurs, the application icon element presented in the valid regions of the $3^{rd}$ and the $4^{th}$ layers of response region are applications corresponding to "recently-installed", the tag indicator 951 (grey area) is desired to be at "recently-installed". After the click action occurs, the tag corresponding to the position upon click is "often-used". Meanwhile, the rotation animation method is carried out to clockwise rotate by 30 degree with lower right corner as a centre, and the tag indicator 951 (grey area) in the valid region of the $2^{nd}$ layer of response region is moved to "often-used" (see FIG. 4).

Further, the responder 946 may be further configured to, if it is judged that the position where the first trigger action occurs belongs to one of the valid regions of the $3^{rd}$ to the nth layers of response region, start the application corresponding to the application icon element corresponding to the first block index value. Taking FIG. 4 as an example, if it is judged that the position upon click belongs to the valid regions of the $4^{th}$ layer of response region, and it is already determined that the first block index value corresponding to the position upon click in the valid regions of the $4^{th}$ layer of response region is 2 (corresponding to the block of "WeChat"), the responder 946 may start the application of "WeChat". Thereby, it is possible to realize to start the application corresponding to the application icon element in the user interface.

Further, besides the click action, the mobile device provided by this embodiment may also responds to a sliding action (i.e., a second trigger action). As shown in FIG. 9, the mobile device may comprise: a second action detecting device 960, a second calculating device 970, a second region detecting device 980 and a second responding device 990. Optionally, the mobile may further comprise a judging device 961.

The second action detecting device 960 may be configured to detect a second trigger action on the user interface. As shown in FIG. 8, the user may perform a sliding action in the valid region in any one of the $3^{rd}$ to the nth layers of response region, and the second action detecting device 960 may determine the sliding action by acquiring a speed and direction of the slide by the user on the screen.

The judging device 961 may be configured to judge whether the action speed of the second trigger action satisfies a requirement that it is higher than a predefined threshold value. In particular, the judging device 961 may acquire a horizontal slide speed and/or a vertical slide speed of the sliding action, and if any one of the speeds is higher than the predefined threshold, then the requirement is satisfied. By judging the slide speed, misoperation may be prevented accordingly. If the result of judging is yes, the judging device 961 may activate the second calculating device 970 to calculate the coordinates of the position where the second trigger action occurs.

The second calculating device 970 may be configured to calculate coordinates of the position where the second trigger action occurs. In particular, the second calculating device 970 may acquire start point coordinates and end point coordinates of the sliding action.

The second region detecting device 980 may be configured to, according to the coordinates of the position where the second trigger action occurs, judge whether the region of the position where the second trigger action occurs belongs to the valid region of the $3^{rd}$ to the nth layers of response region. Generally, if it is judged that the start point coordinates and the end point coordinates of the sliding action are both in the valid region of the $3^{rd}$ to the nth layers of response region, then the second region detecting device 980 may determine that the region of the position where the sliding action occurs belongs to the valid regions of the $3^{rd}$ to the nth layers of response region, and then activate the second responding device 990 to operate; otherwise, determine that the region of the position where the sliding action occurs is not in the valid region of the $3^{rd}$ to the nth layers of response region, then the mobile device will not respond to the sliding action.

The second responding device 990 may be configured to, if the judging result of the second region detecting device 980 is yes, respond to the second trigger action. Optionally, the second responding device 990 may comprise: a second searching device 991, a second container of application icon 992 used for buffering the application icon elements, a second placing device 993, a second moving-out device 994 and a second moving-in device 995.

The second searching device 991 may be configured to, according to the action direction of the second trigger action, search for a second block index value in the valid region of the $2^{nd}$ layer of response region corresponding to the action direction, wherein the second block index value is an index value of one of several blocks into which the valid region of the $2^{nd}$ layer of response region is divided. Assuming that the slide speed of the sliding action has components of vx and vy in x and y directions respectively, a speed vector can be indicated by (vx, vy). The slide direction of the sliding action can be determined by a quadrant where the speed vector is positioned, and the quadrant where the speed vector is positioned can be determined by plus and minus signs of vx and vy. If the speed vector is in the first quadrant, then the slide direction would be toward the upper right; and if the speed vector is in the third quadrant, then the slide direction would be toward the lower left. The slide direction of the sliding action may be also determined based on a tangent value of the slide speed. The tangent value of the slide speed (i.e., vy/vx) may be used to calculate an angle according to an inverse trigonometric function, and the angle is in turn compared with a preset angle; or the tangent value of a preset angle may be calculated, and the tangent value of the preset angle is compared with the tangent value of the slide speed according to the monotonicity of a tangent function, whereby determining the slide direction. Taking FIG. 4 as an example, it is assumed that before the sliding action occurs, the valid regions of the $3^{rd}$ and the $4^{th}$ layers of response region present an application icon element corresponding to "often-used", that is, the application icon element in the current application icon layer is an application icon element corresponding to "often-used". After the sliding action occurs, if it is determined that the slide direction is toward upper right, that is, the user wants to rotate the application icon element corresponding to "recently-installed" into the screen, then it may be determined that the second block index value corresponding to the slide direction in the valid region of the $2^{nd}$ layer of response region is 3 (the block index value of the block where "recently-installed" is positioned); if it is determined that the slide direction is toward lower left, that is, the user wants to rotate the application icon element corresponding to "recently-opened" into the screen, then it may be determined that the second block index value corresponding to the slide direction in the valid region of the $2^{nd}$ layer of response region is 1 (the block index value of the block where "recently-opened" is positioned). If before the sliding action occurs, the valid regions of the $3^{rd}$ and the 4th layers of response region present an application icon element corresponding to "recently-installed", and after the sliding action occurs, if it is determined that the slide direction is toward upper right, then it may be determined that the second block index value corresponding to the slide direction in the valid region of the $2^{nd}$ layer of response region is 1, that is, it may be activated to rotate the application icon element corresponding to "recently-opened" into the screen. Thereby, a circularly displaying effect would be present. In the same manner, if before the sliding action occurs, the valid regions of the $3^{rd}$ and the $4^{th}$ layers of response region present an application icon element corresponding to "recently-opened", and after the sliding action occurs, if it is determined that the slide direction is toward lower left, then it may be determined that the second block index value corresponding to the slide direction in the valid region of the $2^{nd}$ layer of response region is 3, that is, it may be activated to rotate the application icon element corresponding to "recently-installed" into the screen.

The second placing device 993 may be configured to place all the application icon elements of the tag element corresponding to the second block index value into a next second container of application icon; the second moving-out device 994 may be configured to remove all the application icon elements in the current second container of application icon, and remove the plurality of application icon elements presented in the valid region of each of the $3^{rd}$ to the nth layers of response region out of the screen; the second moving-in device 995 may be configured to move all the application icon elements in the next second container of application icon into the current second container of application icon and present the application icon elements in the current second container of application icon on the screen.

In addition, while the switch of tags is realized by the sliding action, a switch of tag indicator 951 may be implemented. In particular, the rotation animation method is carried out to move the tag indicator 951 in the valid region of the $2^{nd}$ layer of response region to a position of the tag element corresponding to the second block index value.

A response to the sliding action by the sector user interface can be realized by the above functional modules. The result of the response is the switch of the tags, and visual effects provided for the user by the above switch would be that, while all the application icons of the original tag rotates out of the screen relative to the centre of the sector, the application icons of the new tag rotates into the screen relative to the centre of the sector, thus realizing a smooth switch of tags.

The mobile device provided by this embodiment realizes responding to the user's trigger action in an order of priority of various response regions of the sector user interface for responding to an event. Taking the click action as an example, after a click action on the user interface is detected, coordinates of the position upon click may be calculated and the layer of response region where the click action occurs may be determined on the basis of the coordinates. Since response region is formed into a rectangular shape and the n layers of response region overlap at one of their corners or edges and increase sequentially, if the position upon click is in the ith layer of response region, it is necessarily in the i+1th to the nth layers of response region. On the ground of this, the mobile device may first judge whether the position upon click is in the valid region of the ith layer of response region; if no, it may in turn judge whether the position upon click is in the valid region of the i+1th layer of response region. That is, the order of the priority of the ith to the nth layers of response region for responding to the event is from high to low. With the above functional modules, the mobile device is able to exactly respond to the user's operations on the sector user interface.

In the mobile device, the sector user interface may provide the user with a convenient access to opening an application corresponding to the UI element. This access is global, which may solve a problem that it is difficult for the user to search applications when using a smart terminal. Further, the mobile device would not display the sector user interface until the user triggers a sector user interface activating instruction, so as to provide a convenient and flexible activation, without affecting operations of other applications and aesthetics of the entire user interface. The sector user interface may comprise n layers of the sector region, each of which can present one or more UI element so as to provide a number of applications. By judging the response region and gestures, the mobile device may provide for the user a number of gesture operations such as a slide for activating the interface, a touch for clicking, a slide for switching the tags, a click for opening application and the like.

In the mobile device, the $2^{nd}$ layer of the sector region of the sector user interface may present a plurality of tag elements, each of which corresponds to the same kind of applications, so as to specifically provide the user with various kinds of applications, satisfy the user's requirement on searching applications, facilitate the search manners and improve the efficiency of search. Main interface of the sector user interface may be displayed at the lower right (lower left) of the screen, such that the user may manipulate the sector user interface using a single thumb and both of right and left hands could be used. Further, in the mobile device, the sector user interface and UI elements could be displayed in a plurality of animation effects and provide a fluent UI interaction for the user.

Algorithm and display provided herein is not inherently related to a particular computer, virtual system or other equipment. Various universal systems may also be used with the teaching based on the present invention. According to the above description, the required structure for such a system is obvious. In addition, the present invention is not directed to any particular programming languages. It should be understood that a variety of programming languages can be used to implement the disclosed invention as described herein and the above description to the particular programming language is to disclose the implementation mode of the present invention.

Each of components according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of terminal devices according to the embodiments of the present invention. The present invention may further be implemented as equipments or device programs (for example, computer programs and computer program products) for executing some or all of the methods as described herein. The programs for implementing the present invention may be stored in the computer readable medium, or have a form of one or more signal. Such a signal may be downloaded from the internet websites, or be provided in carrier, or be provided in other manners.

Figure 10:
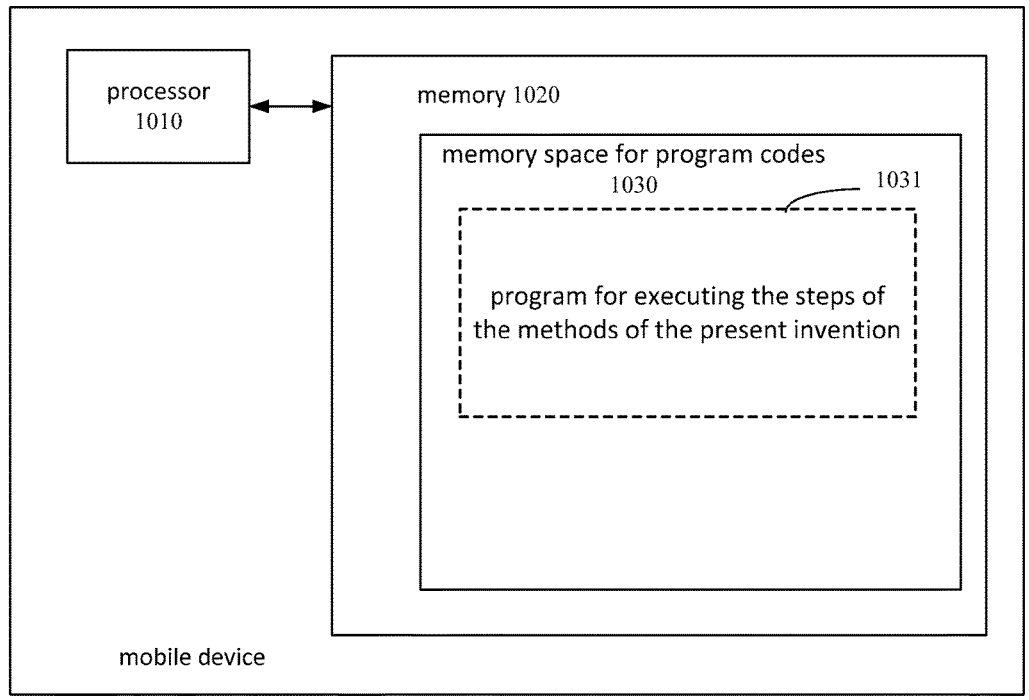
FIG. 10 is a block diagram schematically showing a mobile device which is used to implement the method for responding to events of a user interface of a mobile device according to the present invention.
Figure 11:
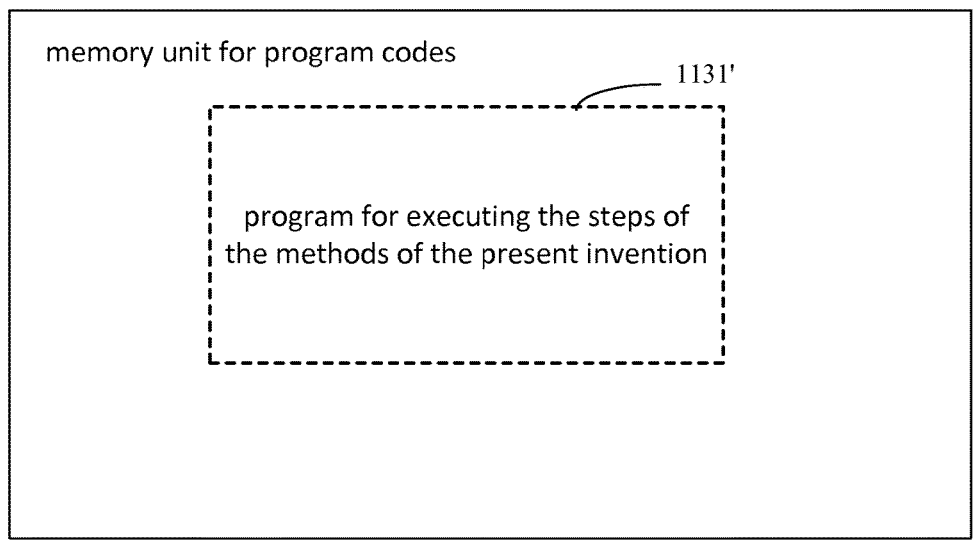
FIG. 11 schematically shows a memory cell which is used to store and carry program codes for implementing the method for responding to events of a user interface of a mobile device according to the present invention.

For example, FIG. 10 is a block diagram schematically showing a mobile device which is used to execute the method for responding to events of a user interface of a mobile device according to the present invention. Traditionally, the mobile device comprises a processor 1010 and a computer program product or a computer readable medium in form of a memory 1020. The memory 1020 may be electronic memories such as flash memory, EEPROM (Electrically Erasable Programmable Read-Only Memory), EPROM, hard disk or ROM. The memory 1020 has a memory space 1030 for executing program codes 1031 of any steps of the above methods. For example, the memory space 1030 for program codes may comprise respective program codes 1031 for implementing the various steps in the above mentioned methods. These program codes may be read from or be written into one or more computer program products. These computer program products comprise program code carriers such as hard disk, compact disk (CD), memory card or floppy disk. These computer program products are usually the portable or stable memory cells as shown in reference FIG. 11. The memory cells may be provided with memory sections, memory spaces, etc., similar to the memory 1020 of the server as shown in FIG. 10. The program codes may be compressed in an appropriate form. Usually, the memory cell includes computer readable codes 1131' which can be read by processors such as 1010. When these codes are operated on the mobile device, the mobile device may execute each step as described in the above methods.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of the present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets should not form a limit of the claims. The wording "comprising/comprise" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

It should also be noticed that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of the present invention is illustrative but not restrictive, and the scope of the present invention is defined by the appended claims.

The invention claimed is:

1. A method for responding to events on a user interface of a mobile device, comprising:
    detecting a first trigger action on the user interface,
        wherein the user interface comprises n layers of response region and one or more user interface elements presented in an valid portion of each layer of response region,
        wherein the valid portion of each layer of response region does not overlap, and a valid portion of a first layer of response region is sector-shaped, and a valid portion of a nth layer of response region is annulus-sector-shaped,
        wherein n>1, each layer of response region is a transparent rectangle, the n layers of response region overlap at one of their corners or edges,
        wherein a mth layer of response region is larger than a m-1th layer of response region, m∈[2, n],
        wherein each layer of response region comprises the valid portion and an invalid portion, each layer of response region responds to a trigger action when a position of the trigger action is in the valid portion, each layer of response region does not respond to the trigger action when the position of the trigger action is in the invalid portion;
    determining coordinates of a position where the first trigger action occurs;
    determining whether the position where the first trigger action occurs belongs to a valid portion of an ith layer of response region;
    in response to a determination that the position where the first trigger action occurs belongs to the valid portion of the ith layer of response region, responding to the first trigger action in the ith layer of response region; and
    in response to a determination that the position where the first trigger action occurs does not belong to the valid portion of the ith layer of response region, updating i to i+1 and repeating the determining step until i equals n+1.

2. The method as claimed in claim 1, wherein, the determining whether the position where the first trigger action occurs belongs to the valid portion of an ith layer of response region further comprises:
    acquiring distance from the coordinates of the position where the first trigger action occurs to an origin of the user interface, wherein the origin of the user interface is an end point of a corner where the n layers of response region overlap or a central point of a side edge where the n layers of response region overlap; and
    determining whether the position where the first trigger action occurs belongs to the valid portion of the ith layer of response region according to the distance from the coordinates of the position where the first trigger action occurs to the origin of the user interface.

3. The method as claimed in claim 2, wherein, the determining whether the position where the first trigger action occurs belongs to the valid portion of the ith layer of response region according to the distance from the coordinates of the position where the first trigger action occurs to the origin of the user interface, comprises:
    determining whether the distance from the coordinates of the position where the first trigger action occurs to the origin of the user interface is between an inner arc radius and an outer arc radius of the valid portion of the ith layer of response region, wherein,
    for the valid portion of the $1^{st}$ layer of response region, the inner arc radius is 0 and the outer arc radius is the radius of the sector region, and for each of the valid portions of the $2^{nd}$ to the nth layers of response region, the inner arc radius is the inner radius of the annulus sector region, and the outer arc radius is the outer radius of the annulus sector region; and
    when a determination result is yes, determining that the position where the first trigger action occurs belongs to the valid portion of the ith layer of response region.

4. The method as claimed in claim 1, wherein, a close user interface element for realizing a user interface closing function is presented in the valid portion of the $1^{st}$ layer of response region; and when it is determined that the position where the first trigger action occurs belongs to the valid portion of the $1^{st}$ layer of response region, the step of responding to the first trigger action in the $1^{st}$ layer of response region comprises a step of closing the user interface.

5. The method as claimed in claim 2, wherein, when it is determined that the position where the first trigger action occurs belongs to one of the valid portions of the $2^{nd}$ to the nth layers of response region, the responding to the first trigger action in the ith layer of response region comprises:
according to the coordinates of the position where the first trigger action occurs, acquiring an angle of the position where the first trigger action occurs with respect to the origin of the user interface;
according to the angle of the position where the first trigger action occurs with respect to the origin of the user interface, searching for a first block index value in the valid portion of the ith layer of response region corresponding to the first trigger action, wherein the first block index value refers to an index value of one of several blocks into which the valid portion of the ith layer of response region is divided; and
responding to the first trigger action according to the first block index value.

6. The method as claimed in claim 5, wherein, the valid portion of the $2^{nd}$ layer of response region presents a plurality of tags elements, and the valid portion of each of the $3^{rd}$ to the nth layer of response region presents a plurality of application icon elements, wherein the application icon elements refer to application icons used to activate applications of the mobile device;
when it is determined that the position where the first trigger action occurs belongs to the valid portion of the $2^{nd}$ layer of response region, the step of responding to the first trigger action according to the first block index value comprises:
placing all the application icon elements of the tag element corresponding to the first block index value into a next container of application icon, the container of application icon is a container used to buffer the application icons;
removing all the application icon elements in a current container of application icon, and removing the plurality of application icon elements presented in the valid portion of each of the $3^{rd}$ to the nth layers of response region from the screen; and
moving all the application icon elements in the next container of application icon into the current container of application icon, and presenting the application icon elements in the current container of application icon layer on the screen.

7. The method as claimed in claim 6, wherein the method further comprises: moving a tag indicator in the valid portion of the $2^{nd}$ layer of response region to a position of the tag element corresponding to the first block index value in the valid portion of the $2^{nd}$ layer of response region corresponding to the position where the first trigger action occurs.

8. The method as claimed in claim 5, wherein the valid portion of each of the $3^{rd}$ to the nth layers of response region presents a plurality of application icon elements; and
when it is determined that the position where the first trigger action occurs belongs to one of the valid portions regions of the $3^{rd}$ to the nth layers of response region, the responding to the first trigger action according to the first block index value comprises: starting the application corresponding to the application icon element corresponding to the first block index value.

9. The method as claimed in claim 1, wherein the method further comprises:
detecting a second trigger action on the user interface;
determining coordinates of the position where the second trigger action occurs;
according to the coordinates of the position where the second trigger action occurs, determining whether the region of the position where the second trigger action occurs belongs to the valid portion of the $3^{rd}$ to the nth layers of response region;
when the judging a determination result is yes, according to the action direction of the second trigger action, searching for a second block index value in the valid portion of the $2^{nd}$ layer of response region corresponding to the action direction, wherein the second block index value refers to an index value of one of several blocks into which the valid portion of the $2^{nd}$ layer of response region is divided;
placing all the application icon elements of the tag element corresponding to the second block index value into a next container of application icon;
removing all the application icon elements in a current container of application icon, and removing the plurality of application icon elements presented in the valid region of each of the $3^{rd}$ to the nth layers of response region out of the screen; and
moving all the application icon elements in the next container of application icon into the current container of application icon, and presenting the application icon elements in the current container of application icon on the screen.

10. The method as claimed in claim 9, wherein before the determining coordinates of the position where the second trigger action occurs, the method further comprises: determining whether action speed of the second trigger action satisfies a requirement that it is higher than a predefined threshold value; and
when it is determined that the action speed of the second trigger action satisfies the requirement that it is higher than the predefined threshold value, performing the determining coordinates of the position where the second trigger action occurs.

11. The method as claimed in claim 9, wherein the method further comprises: moving a tag indicator in the valid portion of the $2^{nd}$ layer of response region to the position of the tag element corresponding to the second block index value.

12. The method as claimed in claim 9, wherein the second trigger action is a sliding action.

13. A mobile device, comprising:
a processor; and
a memory communicatively coupled to the processor and storing instructions that upon execution by the processor cause the mobile device to:
detect a first trigger action on an user interface of the mobile device,
wherein the user interface comprises n layers of response region and one or more user interface elements presented in an valid portion of each layer of response region,
wherein the valid portion of each layer of response region does not overlap, and a valid portion of a first layer of response region is sector-shaped, and a valid portion of a nth layer of response region is annulus-sector-shaped, wherein n>1, each layer of response region is a transparent rectangle, the n layers of response region overlap at one of their corners or edges,
wherein a mth layer of response region is larger than a m-1th layer of response region, m∈[2, n],
wherein each layer of response region comprises the valid portion and an invalid portion, each layer of response region responds to a trigger action when a position of the trigger action is in the valid portion, each layer of response region does not respond to the trigger action when the position of the trigger action is in the invalid portion;
determine coordinates of a position where the first trigger action occurs;
determine whether the position where the first trigger action occurs belongs to a valid portion of an ith layer of response region;
in response to a determination that the position where the first trigger action occurs belongs to the valid portion of the ith layer of response region, respond to the first trigger action in the ith layer of response region; and
in response to a determination that the position where the first trigger action occurs does not belong to the valid portion of the ith layer of response region, update i to i+1 and repeat a determining step until i equals n+1.

14. The mobile device as claimed in claim 13, wherein the memory further stores instructions that upon execution by the processor to cause the mobile device to:
acquire distance from the coordinates of the position where the first trigger action occurs to an origin of the user interface, wherein the origin of the user interface is an end point of a corner where the n layers of response region overlap or a central point of a side edge where the n layers of response region overlap; and
determine whether the position where the first trigger action occurs belongs to the valid portion of the ith layer of response region according to the distance from the coordinates of the position where the first trigger action occurs to the origin of the user interface.

15. The mobile device as claimed in claim 14, wherein the memory further stores instructions that upon execution by the processor to cause the mobile device to:
determine whether the distance from the coordinates of the position where the first trigger action occurs to the origin of the user interface is between an inner arc radius and an outer arc radius of the valid portion of the ith layer of response region, when a determination result is yes, determine that the position where the first trigger action occurs belongs to the valid portion of the ith layer of response region;
wherein, for the valid portion of the $1^{st}$ layer of response region, the inner arc radius is 0 and the outer arc radius is the radius of the sector region; for each of the valid portions of the $2^{nd}$ to the nth layers of response region, the inner arc radius is the inner radius of the annulus sector region, and the outer arc radius is the outer radius of the annulus sector region.

16. The mobile device as claimed in claim 13, wherein a close user interface element for realizing a user interface closing function is presented in the valid portion of the $1^{st}$ layer of response region; and wherein the memory further stores instructions that upon execution by the processor to cause the mobile device to:
when it is determined that the position where the first trigger action occurs belongs to the valid portion of the $1^{st}$ layer of response region, close the user interface.

17. The mobile device as claimed in claim 14, wherein wherein the memory further stores instructions that upon execution by the processor to cause the mobile device to:
according to the coordinates of the position where the first trigger action occurs, acquire an angle of the position where the first trigger action occurs with respect to the origin of the user interface;
according to the angle of the position where the first trigger action occurs with respect to the origin of the user interface, search for a first block index value in the valid portion of the ith layer of response region corresponding to the first trigger action, wherein the first block index value refers to an index value of one of several blocks into which the valid portion of the ith layer of response region is divided; and
respond to the first trigger action according to the first block index value.

18. The mobile device as claimed in claim 17, wherein the valid region of the $2^{nd}$ layer of response region presents a plurality of tags elements, and the valid region of each of the $3^{rd}$ to the nth layer of response region presents a plurality of application icon elements, wherein the application icon elements refer to application icons used to activate applications of the mobile device; and wherein the memory further stores instructions that upon execution by the processor to cause the mobile device to:
buffer the application icon elements;
when it is determined that the position where the first trigger action occurs belongs to the valid portion of the $2^{nd}$ layer of response region, place all the application icon elements of the tag element corresponding to the first block index value into a next first container of application icon;
remove all the application icon elements in a current first container of application icon, and remove the plurality of application icon elements presented in the valid portion of each of the $3^{rd}$ to the nth layers of response region from the screen; and
move all the application icon elements in the next first container of application icon into the current first container of application icon, and present the application icon elements in the current first container of application icon on the screen.

19. The mobile device as claimed in claim 18, wherein the mobile device further comprises: a tag indicator which is presented in the valid portion of the $2^{nd}$ layer of response region, the tag indicator being moved to a position of the tag element corresponding to the first block index value in the valid portion of the $2^{nd}$ layer of response region corresponding to the position where the first trigger action occurs.

20. The mobile device as claimed in claim 17, wherein the valid portion of each of the $3^{rd}$ to the nth layers of response region presents a plurality of application icon elements; and wherein the memory further stores instructions that upon execution by the processor to cause the mobile device to:
determine that the position where the first trigger action occurs belongs to one of the valid portions of the $3^{rd}$ to the nth layers of response region, start the application corresponding to the application icon element corresponding to the first block index value.

21. The mobile device as claimed in claim 13, wherein the memory further stores instructions that upon execution by the processor to cause the mobile device to:
detect a second trigger action on the user interface, calculate coordinates of the position where the second trigger action occurs;

according to the coordinates of the position where the second trigger action occurs, determine whether the position where the second trigger action occurs belongs to a valid portion of a layer among the $3^{rd}$ to the nth layers of response region.

22. The mobile device as claimed in claim 21, wherein the memory further stores instructions that upon execution by the processor to cause the mobile device to:
according to the action direction of the second trigger action, search for a second block index value in the valid portion of the $2^{nd}$ layer of response region corresponding to the action direction, wherein the second block index value refers to an index value of one of several blocks into which the valid portion of the $2^{nd}$ layer of response region is divided;
buffer the application icon elements;
place all the application icon elements of the tag element corresponding to the second block index value into a next second container of application icon;
remove all the application icon elements in a current second container of application icon, and remove the plurality of application icon elements presented in the valid region of each of the $3^{rd}$ to the nth layers of response region out of the screen; and
move all the application icon elements in the next second container of application icon into the current second container of application icon, and present the application icon elements in the current second container of application icon on the screen.

23. The mobile device as claimed in claim 21, wherein the memory further stores instructions that upon execution by the processor to cause the mobile device to:
determine whether action speed of the second trigger action satisfies a requirement that it is higher than a predefined threshold value; and
when a determination result is yes, activate calculate coordinates of the position where the second trigger action occurs.

24. The mobile device as claimed in claim 21, wherein the mobile device further comprises: a tag indicator which is presented in the valid portion of the $2^{nd}$ layer of response region, the tag indicator being moved to a position of the tag element corresponding to the second block index value.

25. A non-transitory computer readable medium, having instructions stored thereon that, when executed by at least one processor, cause the at least one processor to perform operations for responding to events of a user interface of a mobile device, the operations comprising:
detecting a first trigger action on the user interface,
wherein the user interface comprises n layers of response region and one or more user interface elements presented in an valid portion of each layer of response region,
wherein the valid portion of each layer of response region does not overlap, and a valid portion of a first layer of response region is sector-shaped, and a valid portion of a nth layer of response region is annulus-sector-shaped,
wherein n>1, each layer of response region is a transparent rectangle, the n layers of response region overlap at one of their corners or edges,
wherein a mth layer of response region is larger than a m-1th layer of response region, m∈[2, n],
wherein each layer of response region comprises the valid portion and an invalid portion, each layer of response region responds to a trigger action when a position of the trigger action is in the valid portion, each layer of response region does not respond to the trigger action when the position of the trigger action is in the invalid portion;
determining coordinates of a position where the first trigger action occurs;
determining whether the position where the first trigger action occurs belongs to a valid portion of an ith layer of response region;
in response to a determination that the position where the first trigger action occurs belongs to the valid portion of the ith layer of response region, responding to the first trigger action in the ith layer of response region; and
in response to a determination that the position where the first trigger action occurs does not belong to the valid portion of the ith layer of response region, updating i to i+1 and repeating the determining step until i equals n+1.

* * * * *